(12) United States Patent
Kurata et al.

(10) Patent No.: US 9,227,498 B2
(45) Date of Patent: Jan. 5, 2016

(54) STRUCTURE OF MOUNTING COWL-TOP COVER

(71) Applicant: NIHON PLAST CO., LTD., Fujinomiya-shi, Shizuoka (JP)

(72) Inventors: Takenori Kurata, Shizuoka (JP); Daisuke Serizawa, Shizuoka (JP)

(73) Assignee: Nihon Plast Co., LTD., Fujinomiya (JP)

( * ) Notice: Subject to any disclaimer, the term of this patent is extended or adjusted under 35 U.S.C. 154(b) by 0 days.

(21) Appl. No.: 14/566,548

(22) Filed: Dec. 10, 2014

(65) Prior Publication Data

US 2015/0091332 A1    Apr. 2, 2015

Related U.S. Application Data

(62) Division of application No. 13/563,438, filed on Jul. 31, 2012.

(30) Foreign Application Priority Data

Aug. 1, 2011   (JP) ................................. 2011-168661
Oct. 20, 2011  (JP) ................................. 2011-230823

(51) Int. Cl.
  *B60J 10/02*   (2006.01)
  *B62D 25/08*   (2006.01)

(52) U.S. Cl.
  CPC .............. *B60J 10/02* (2013.01); *B62D 25/081* (2013.01)

(58) Field of Classification Search
  CPC ............ B60H 1/28; B60J 1/004; B60J 10/02; B62D 25/081
  See application file for complete search history.

(56) References Cited

U.S. PATENT DOCUMENTS

| | | | |
|---|---|---|---|
| 7,870,958 B1* | 1/2011 | Gross et al. ................... | 206/448 |
| 8,491,043 B2* | 7/2013 | Yamagishi et al. ........... | 296/192 |
| 8,628,137 B2* | 1/2014 | Platt et al. ...................... | 296/93 |
| 8,757,706 B2* | 6/2014 | Sasaki ........................... | 296/192 |
| 2003/0000162 A1* | 1/2003 | Gaiser et al. .................. | 52/204.5 |
| 2003/0006623 A1* | 1/2003 | Cornils et al. ................. | 296/93 |
| 2003/0057660 A1 | 3/2003 | Ortmuller et al. | |
| 2004/0124669 A1* | 7/2004 | Eynon et al. .................. | 296/192 |
| 2009/0026805 A1* | 1/2009 | Benvenuto et al. ........... | 296/192 |
| 2014/0319878 A1* | 10/2014 | Sano et al. ..................... | 296/192 |
| 2014/0327267 A1* | 11/2014 | Deussen et al. ................ | 296/93 |
| 2014/0346803 A1* | 11/2014 | Timmermann et al. ......... | 296/93 |
| 2014/0367989 A1* | 12/2014 | Erner ............................ | 296/84.1 |
| 2014/0374401 A1* | 12/2014 | Nakagawa .................... | 219/203 |

FOREIGN PATENT DOCUMENTS

| | | | | |
|---|---|---|---|---|
| DE | 102011116628 A1 * | 4/2013 | ............. | B62D 25/08 |
| DE | 202013101568 U1 * | 4/2013 | ............... | B60J 10/02 |

(Continued)

*Primary Examiner* — Glenn Dayoan
*Assistant Examiner* — Paul Chenevert
(74) *Attorney, Agent, or Firm* — Arent Fox LLP

(57) ABSTRACT

A protrusion portion of a clip member is abutted against an end face of a front glass lower end, and the clip member is fixed to a back face of the front glass via an adhesive agent. An engagement portion that is formed in a tongue piece of a cowl-top cover is engaged with a target engagement portion of the clip member, and the cowl-top cover is mounted in a state in which a surface of the cowl-top cover and a surface of the front glass are arranged so as to be flush with each other. In addition, an engagement direction is defined as an engagement direction taken along a lengthwise direction oriented from a lower end to an upper end of the front glass.

3 Claims, 18 Drawing Sheets

(56) References Cited

FOREIGN PATENT DOCUMENTS

| DE | 202014005240 U1 * | 9/2014 | ............ B60R 13/04 |
| DE | 102013012628 A1 * | 1/2015 | ............ B60R 13/07 |
| DE | 202014010197 U1 * | 2/2015 | ............ B60J 10/02 |
| EP | 1775200 A2 * | 4/2007 | ............ B62D 25/08 |
| FR | 2909042 A1 * | 5/2008 | ............ B60J 10/02 |
| FR | 2970437 A1 * | 7/2012 | ............ B60H 1/28 |
| JP | 2003-532574 A | 11/2003 | |
| JP | 2010-264868 A | 11/2010 | |
| WO | WO 0185481 A1 | 11/2001 | |
| WO | WO 2014091668 A1 * | 6/2014 | ............ B69J 10/12 |

* cited by examiner

STRUCTURE OF MOUNTING COWL-TOP COVER

CROSS-REFERENCE TO RELATED APPLICATIONS

This Application is a Divisional of U.S. patent application Ser. No.: 13/563438, filed Jul. 31, 2012, which claims priority to Japanese Patent Application No. 2011-168661, filed Aug. 1, 2011 and Japanese Patent Application No. 2011-230823, filed Oct. 20, 2011. The disclosure of each of the prior applications is hereby incorporated in its entirety by reference.

BACKGROUND OF THE INVENTION

1. Field of the Invention

The present invention relates to a structure of mounting a cowl-top cover that is disposed between a front glass and a front hood of a vehicle.

2. Description of the Related Art

Conventionally, there have been employed a number of cowl-top cover mounting structures in such a manner as to hold and support a lower end part of a front glass by means of a clip member that is formed at a rear end part of the cowl-top cover. A mounting structure of such type serves as a constituent element adapted to hold the lower end part of the front glass from the upper and lower directions by means of a clip; and therefore, a boundary portion between the lower end part of the front glass and the cowl-top cover is swelled by means of a plate thickness of a clip member.

Accordingly, as a vehicle cowl-louver structure (refer to Japanese Unexamined Patent Application Publication No. 2010-264868, for example), there has been proposed a construction in which the swelling in the boundary portion between the lower end part of the front glass and the cowl-top cover is eliminated, and its related surfaces are flush with each other between the lower end part of the front glass and the rear end part of the cowl-top cover. Such a layout construction in which the surfaces are flush with each other is provided, thereby making it possible to improve an external view in the boundary portion between the front glass and the cowl-top cover.

While the vehicle cowl-louver structure described in Japanese Unexamined Patent Application Publication No. 2010-264868 is shown as the related art in comparison with the present invention, FIG. 17 shows a sectional view of essential portions of a cowl-louver main body and a window shield glass. As shown in FIG. 17, a lip member 52 is mounted on the side of a rear end part 50a of the cowl-louver main body 50, and via the lip member 52, the cowl-louver main body 50 abuts against an end face of a lower end side of the window shield glass 51.

On a back face of the window shield glass 51, a clip 53 having a hook-shaped engagement protrusion 54 is fixed via a double-sided tape. The engagement protrusion 54 is formed in a shape in which the protrusion is released to an upper side of a vehicle, and a claw portion 55 that is erected downward from a back face of the cowl-louver main body 50 is capable of engaging the cowl-louver main body 50 therewith by moving the claw portion from top to bottom with respect to a clip 53. That is, the cowl-louver main body 50 is moved in a direction orthogonal to that of a face of the window shield glass 51.

In a state in which the claw portion 55 of the cowl-louver main body 50 is engaged with the engagement protrusion 54 of the clip 53, a surface of the window shield glass 51, a surface of the lip member 52, and a surface of the cowl-louver main body 50 can be arranged so as to be flush with each other.

According to the invention described in Japanese Unexamined Patent Application Publication No. 2010-264868, the cowl-top louver main body 50 is moved in a direction orthogonal to the face of the window shield glass 51, that is, in a direction from top to bottom, whereby the claw portion 55 can be engaged with the engagement protrusion 54 of the clip 53. Thus, when the claw portion 55 is pushed so as to be thereby engaged with the engagement protrusion 54, a bending stress acts on the back face of the window shield glass 51 fixing the clip 53.

Due to an influence of the bending stress acting on the window shield glass 51, there is a possibility that the window shield glass 51 cracks or breaks and then there is a need to set a plate thickness of the window shield glass 51 so as to be thick. In addition, due to a compression force that is exerted when the claw portion 55 is pushed against the engagement protrusion 54, a force that is produced in a rotating direction with respect to the window shield glass 51 acts on the clip 53. This rotation force acts on a bonding face between the clip 53 and the window shield glass 51, there is a possibility that a double-sided tape that is attached to the bonding face is released therefrom and thus there is a need to use adhesive agent with its strong adhesive force.

It is an object of the present invention to provide a cowl-top cover mounting structure that: is capable of arranging a surface of a front glass and a surface of a cowl-top cover so as to be flush with each other; is further capable of engaging the cowl-top cover with a clip member fixed to the front glass without causing the front glass to crack or break; and moreover, is capable of preventing unlocking of the clip member and the front glass, without a need to provide a special reinforcement when the cowl-top cover is engaged with the clip member.

SUMMARY OF THE INVENTION

In one aspect of the present invention, a structure of mounting a cowl-top cover which abuts against a lower end part of a front glass that is arranged at a vehicle body front part, which covers a portion between a rear end part of a front hood covering an upper opening of a front compartment of a vehicle and a lower end part of the front glass, and which is provided to extend in a vehicle widthwise direction, the structure comprising:

a clip member that is arranged between the cowl-top cover and the front glass, and is securely fixed to a back face on a lower end side of the front glass;

an engagement portion that is formed in the cowl-top cover; and a target engagement portion which is formed in the clip member, and with which the engagement portion is engaged, wherein the engagement portion engages with the target engagement portion in an engagement direction taken along a lengthwise direction oriented from a lower end to an upper end of the front glass, and when the engagement portion is engaged with the target engagement portion, a surface of the cowl-top cover and a surface of the front glass are arranged to be flush with each other.

In the aspect of the present invention, the structure of mounting the cowl-top cover wherein the clip member includes:

a fixing face that is to be fixed in abutment against the back face on the lower end side of the front glass; and a protrusion portion that is erected upward from the fixing face, and abuts against an end face of the lower end of the front glass.

In the aspect of the present invention, the structure of mounting the cowl-top cover, wherein the cowl-top cover includes a tongue piece portion, which is formed on a back face of the cowl-top cover, which is formed in a substantial L shape in a cross section in a forward and backward direction of the vehicle, and in which a free end of the L shape is formed toward the front glass, and the engagement portion is formed in the tongue piece portion.

In the aspect of the present invention, the structure of mounting the cowl-top cover, wherein a soft member adapted to embed a gap between the cowl-top cover and an end face of the lower end of the front glass, the soft member is arranged between the cowl-top cover and the end face on the lower end of the front glass, when the engagement portion and the target engagement portion are engaged with each other, a surface of the soft member, the surface of the cowl-top cover, and the surface of the front glass are arranged to be flush with each other.

Further, in the aspect of the present invention, the structure of mounting the cowl-top cover, wherein the soft member is mounted on the cowl-top cover.

In the aspect of the present invention, the structure of mounting the cowl-top cover, wherein the protrusion portion is formed so as to embed a gap between the cowl-top cover and the end face on the lower end of the front glass, the abutment faces adapted to abut against each other oppositely between the cowl-top cover and the protrusion portion, having a tilt face tilting along a forward and backward direction of the vehicle, and when the engagement portion and the target engagement portion are engaged with each other, a surface of the protrusion portion, the surface of the cowl-top cover, and the surface of the front glass are arranged to be flush with each other.

Further, in the aspect of the present invention, the structure of mounting the cowl-top cover, wherein a portion between the clip member and the cowl-top cover is sealed.

In another aspect of the present invention, a structure of mounting a cowl-top cover, the structure comprising:

a cowl cover including a cover main body portion adapted to cover a cowl portion between a front glass and a vehicle body member and an engagement stop claw portion that is protrusively provided on a back face side of the cover main body portion, and that has a claw portion on one side face; and a receptacle member having a target securely fixing portion to be securely fixed to a back face side of an edge part of the front glass and an engagement portion which is protrusively provided from the target securely fixing portion, and with which the claw portion engages, wherein when the claw portion is engaged with the engagement portion, a surface of the cowl cover and a surface of the front glass are arranged to be flush with each other.

In the other aspect of the present invention, the structure of mounting the cowl-top cover, wherein the claw portion is formed to be protruded from the engagingly stop claw portion toward the front glass side.

In the other aspect of the present invention, the structure of mounting the cowl-top cover, wherein the receptacle member includes a protrusion portion that is positioned between a target securely fixing portion and an engagement portion, and that protrudes in opposite to an edge part on the cowl cover side of the front glass, and the structure of mounting the cowl-top cover includes a soft cover member which is protrusively provided integrally at an edge part on the front glass side of the cover main body portion, and in which a tip end side is inserted and fixed between the edge part on the cowl-cover side of the front glass side and the protrusion portion to thereby cover a portion between the edge part on the cowl-cover side of the front glass and the cover main body portion.

The structure of mounting the cowl-top cover according to the one aspect of the present invention is provided in such a manner that, when an engagement portion formed in a cowl-top cover is engaged with an target engagement portion of a clip member that is securely fixed to a back face on a lower end side of a front glass, an engagement direction is adapted so as to be an engagement direction taken along a lengthwise direction oriented from a bottom end to a top end of the front glass.

With such a construction, when the cowl-top cover is engaged with the clip member fixed to the front glass, the cowl-top cover is engaged while moving in a direction taken along the lengthwise direction of the front glass, and no bending stress is disallowed to act on the front glass at the time of engagement.

Thus, a case that a clip member is unlocked from a front glass or a case with front glass cracks or breaks does not occur. In addition, a work of mounting the cowl-top cover can be carried out speedily and within a short period of time. Further, the engagement direction between the cowl-top cover and the clip member is defined as an engagement direction taken along the lengthwise direction of the front glass and thus even if a vehicle body panel is not constructed as a reinforcement member, the cowl-top cover can be engaged with the clip member.

As has been described above, the front glass is not adversely influenced at the time of engagement of the cowl-top cover and thus no defect or the like occurs with the front glass during mounting work, and there is no need to replace with a new front glass, enhancing work efficiency and, in turn, contributing to cost reduction as well.

In addition, when the cowl-top cover is engaged with the clip member, the surface of the front glass and the surface of the cowl-top cover can be formed so as to be flush with each other, thus making it possible to improve an external view in the boundary portion between the front glass and the cowl-top cover.

The structure of mounting the cowl-top cover according to the other aspect of the present invention is provided in such a manner as to enable the clip member to be constructed so that a protrusion portion that is erected upward from a fixed face to be fixed in abutment against a back face on a lower end side of a front glass is abutted against an end face of a front glass lower end. When the cowl-top cover is engaged with the clip member fixed to the front glass, a shear force acts on a portion between the clip member and the front glass; and however, the protrusion portion is adapted to abut against the end face of the front glass lower end, thus making it possible to prevent the shear force from acting on a securely fixed portion between the clip member and the front glass. In this manner, the clip member and the front glass can be rigidly maintained to be fixed to each other.

The structure of mounting the cowl-top cover according to the other aspect of the present invention is provided in such a manner that an engagement portion adapted to engage with a target engagement portion of the clip member can be formed at a tongue piece portion that has a substantially L-shaped sectional shape, the tongue piece being formed on a back face of the cowl-top cover. With such a construction, when the cowl-top cover is engaged with the clip member, an elastic deformation force by which the sectional shape is produced by the L-shaped tongue piece portion can be utilized as an engagement force at the time of engagement. In addition, the target engagement portion can be engaged so as to be held by means of the substantially L-shaped tongue piece; and therefore, the engaged state can be firmly maintained.

The structure of mounting the cowl-top cover according to the other aspect of the present invention is provided in such a manner as to enable a soft member to be employed to embed a gap between the cowl-top cover and the end face of the front glass lower end. Moreover, when the engagement portion of the cowl-top cover is engaged with the target engagement portion of the clip member, it is possible to construct the surface of the soft member, the surface of the cowl-top cover, and the surface of the front glass so as to be arranged to be flush with each other.

With such a construction, it is possible to prevent a gap from being formed between the cowl-top cover and the front glass due to the soft member, and moreover, abutment between the cowl-top cover and the front glass can be softened. In addition, the surface of the soft member, the surface of the cowl-top cover, and the surface of the front glass can be constructed so as to be flush with each other and thus an external view in the boundary portion between the front glass and the cowl-top cover can be improved.

In addition, the soft member can be constructed so as to be mounted on the cowl-top cover, can be constructed so as to be mounted on the protrusion portion of the clip member, or can be constructed so as to be mounted in advance to the end face of the front glass lower end. The soft member is constructed so as to be mounted in advance to the cowl-top cover, whereby when the cowl-top cover is engaged with the clip member, there is no need to carry out positioning of the soft member, and the work of mounting the cowl-top cover can be easily carried out.

The structure of mounting the cowl-top cover according to the other aspect of the present invention is provided in such a manner that a layout construction adapted to embed a gap between the cowl-top cover and the end face of the front glass lower end can be formed by employing the protrusion portion of the clip member. In addition, a shape of an abutment face to abut between the cowl-top cover and the protrusion portion in opposite to each other can be formed in a shape having a tilt face that is tilted along a forward and backward direction of a vehicle.

With such a construction, the cowl-top cover and the protrusion portion abut against each other on the tilt face. Therefore, even if a gap is formed between the cowl-top cover and the protrusion portion due to any cause such as a processing error of the cowl-top cover or clip member, such a gap is obtained as a gap that is obliquely tilted from an upper side of the cowl-top cover and the protrusion portion. In addition, a depth that can be visually seen through the gap becomes shallow, making it possible to restrain degradation of the external view in the boundary portion between the cowl-top cover and the protrusion portion.

In addition, the surface of the protrusion portion, the surface of the cowl-top cover, and the surface of the front glass can be constructed so as to be flush with each other, thus making it possible to improve an external view in the boundary portion between the front glass and the cowl-top cover.

The structure of mounting the cowl-top cover according to the other aspect of the present invention is provided in such a manner that a portion between the clip member and the cowl-top cover can be sealed. With such a construction, it is possible to prevent forming of a gap or a leakage of a noise that is produced in a front compartment to the outside.

The structure of mounting the cowl-top cover according to the other aspect of the present invention is provided in such a manner that a claw portion is provided on one side face of an engagingly stop claw portion that is protrusively provided on a back face side of a cover main body portion of a cowl cover, whereby a rear face side of the claw portion that is the other face side of the engagingly stop claw portion is not constrained by the cover main body portion. Thus, it is possible to ensure a relief with respect to a stress concentration to a proximal end side of the engagingly stop claw portion when the engagingly stop claw portion is engaged with an engagement portion of a receptacle member that is positioned at an edge part of a window shield, the relief being exerted by a dimensional deviation of the cowl cover and the receptacle member, without a need to increase a thickness of the proximal end side that is continuous to the cover main body portion of the engagingly stop claw portion than necessary, and a reinforce rib or the like is provided on the other lateral face side of the engagingly stop claw portion, making it possible to ensure strength. Therefore, a molding failure such as a shrink caused by an increase in thickness of the proximal end side of the engagingly stop claw portion is unlikely to occur on a surface of the cover main body portion, the degradation of the external view can be prevented, making it possible to improve reliability of the engagingly stop claw portion.

The structure of mounting the cowl-top cover according to the other aspect of the preset invention is provided in such a manner that, in addition to the advantageous effect of the cowl-cover device of according to the claim 8, a claw portion is formed so as to be protruded from an engagingly stop claw portion toward a window shield side, whereby a fixed center of a cowl cover is set at a position that is more proximal to the window shield and thus even in a case where a dimensional deviation of the cowl cover and the receptacle member exists, it is possible to restrain a step difference between the window shield side and the cover main body portion side of the cowl cover.

The structure of mounting the cowl-top cover according to the other aspect of the present invention is provided in such a manner that, in addition to the advantageous effect of the cowl cover device of according to the claim 8, even if a positional relationship between a cowl cover and a window shield is relatively varied due to a deformation or dimensional deviation of the cowl cover, a soft cover member that is fixed by inserting a tip end between an edge part of the cowl cover side of the window shield and a protrusion portion of the receptacle member faithfully follows this variation quantity, thus making it possible to prevent degradation of an external view due to opening of a portion between the edge part of the cowl cover side of the window shield and the cover main body portion.

DESCRIPTION OF THE PREFERRED EMBODIMENTS

Hereinafter, preferred embodiments of the present invention will be specifically described with reference to the accompanying drawings. As a cowl-top cover mounting structure, according to the present invention, any shape or construction other than those to be described later can be employed as long as it is possible to solve the problem of the present invention. Therefore, the present invention is not limited to the embodiments to be described later, and various modifications can occur.

In the present invention, a direction in which a vehicle moves forward is defined as a front face side or a front end side, and a backward direction is defined as a rearward side, a rear base, or a rear end side. In addition, in a vertical direction of the vehicle, a road surface side is defined as a lower side, a lower end side, or a back face side, and a ceiling side is defined as an upward side, an upper end side, or a surface side.

[First Embodiment]

In a first embodiment, a construction example in which a step difference portion formed in a clip member is employed as a target engagement portion engaging with a cowl-top cover will be described with reference to FIG. 2 to FIG. 4. First, with reference to FIG. 1, a layout construction of a cowl-top cover 10 in a vehicle 1 will be described.

Figure 1:
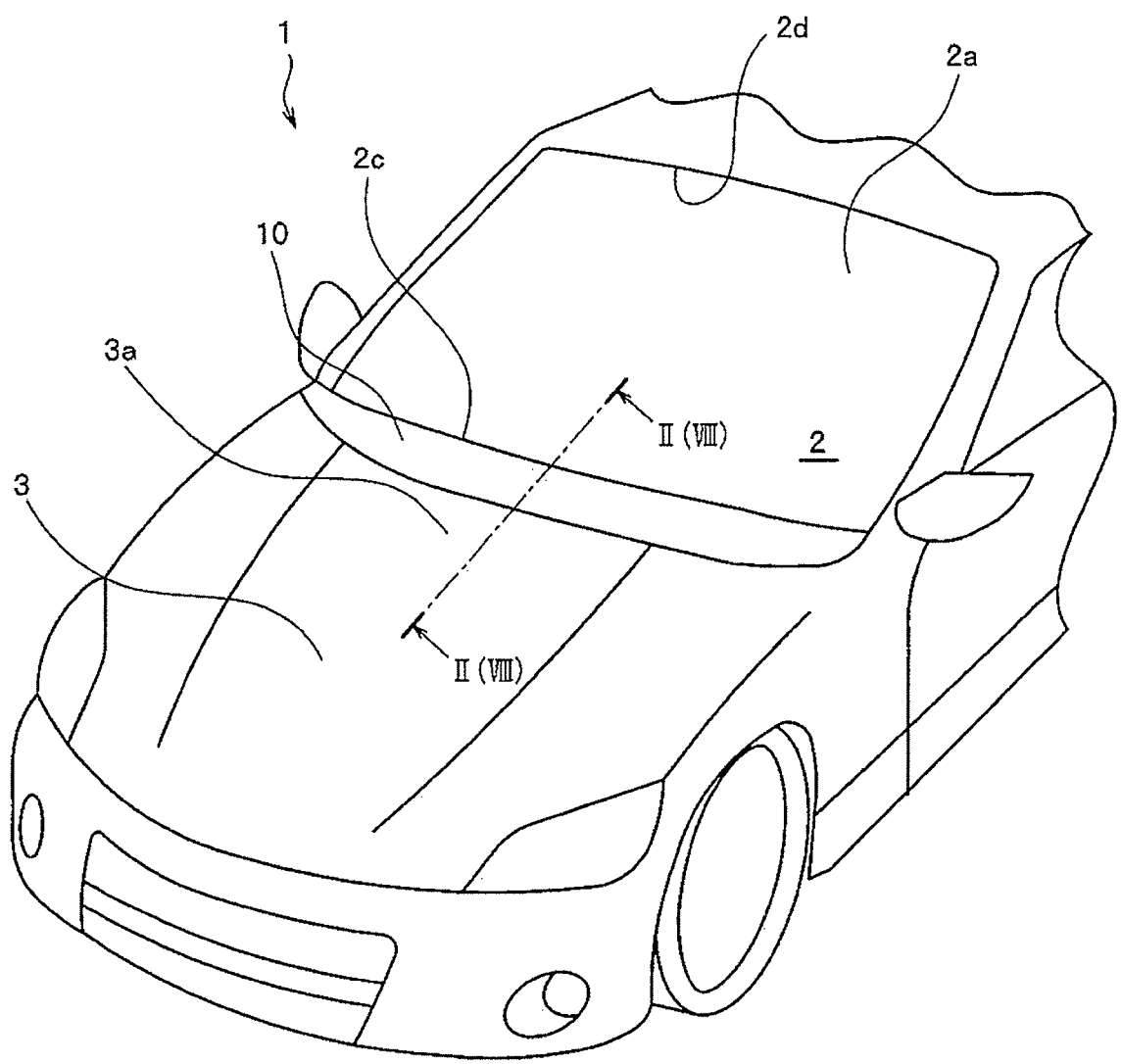
FIG. 1 is a perspective view showing a front face side of a vehicle (an embodiment).

FIG. 1 shows a perspective view when the vehicle 1 is seen from an obliquely front side. It is to be noted that a wiper or the like is not shown. On a vehicle front side of the vehicle 1, a front glass 2 is arranged, and the front glass 2 is arranged in a state in which a surface 2a of the front glass 2 is tilted to a vehicle rearward side from a lower end 2c of the front glass 2 toward an upper end 2d that is a vehicle upper side. In addition, a portion between a lower end part of the front glass 2 and a rear end part 3a of a front hood 3 that covers an upper opening of a front compartment is covered with the cowl-top cover 10. A cowl-top cover 10 is obtained as a layout construction that is provided to extend all over a vehicle widthwise direction.

Figure 2:
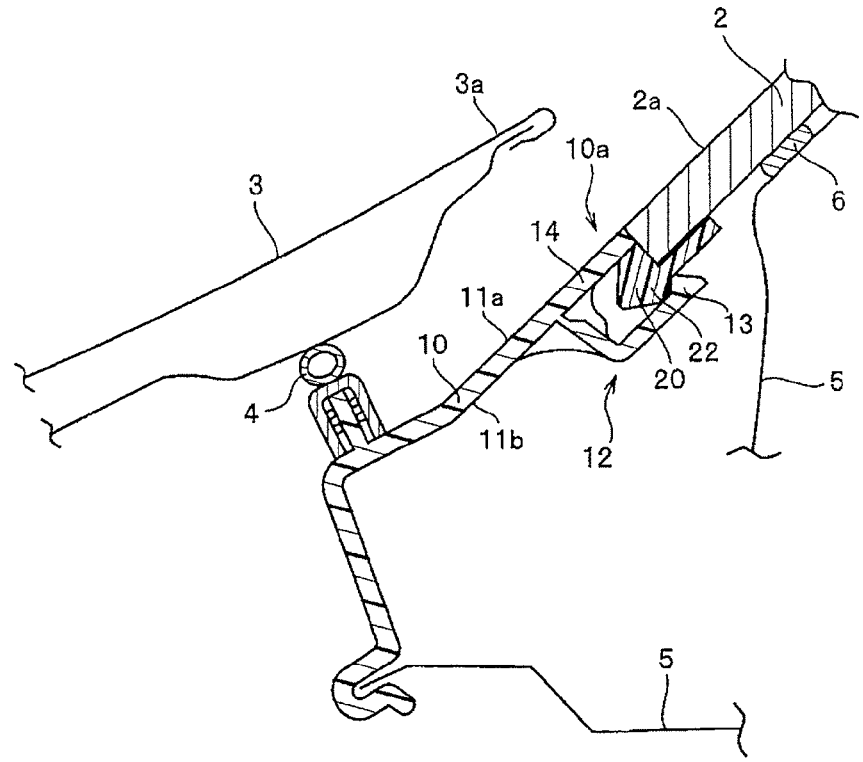
FIG. 2 is a sectional view taken along the line II-II of FIG. 1 (a first embodiment).

As shown in FIG. 2 that is a cross section taken along the line of FIG. 1, a font end side of the cowl-top cover 10 is mounted on a cowl main body 5 that is fixed to a vehicle body panel, and the side of a rear end part 10a engages with a clip member 20 that is fixed to a back face 2b of a front glass lower end 2c. The cowl main body 5 is made of a metal plate, and is arranged along a vehicle widthwise direction on a lower end side of the front glass 2.

An upper end part of the cowl main body 5 is fixed via a fixing seal 6 that is securely fixed to the back face 2b on the lower end side of the front glass 2. On the cowl main body 5, a conduit portion forming a flow path for drainage or a duct opening portion for air instruction is formed, although not shown.

In a state in which the front hood 3 is closed, the back face side of the front hood 3 comes into pressure contact with a hood seal 4 that is provided on a front side of the cowl-top cover 10. In addition, by means of the hood seal 4, entry of raindrops or the like into the front compartment is prevented.

Figure 3:
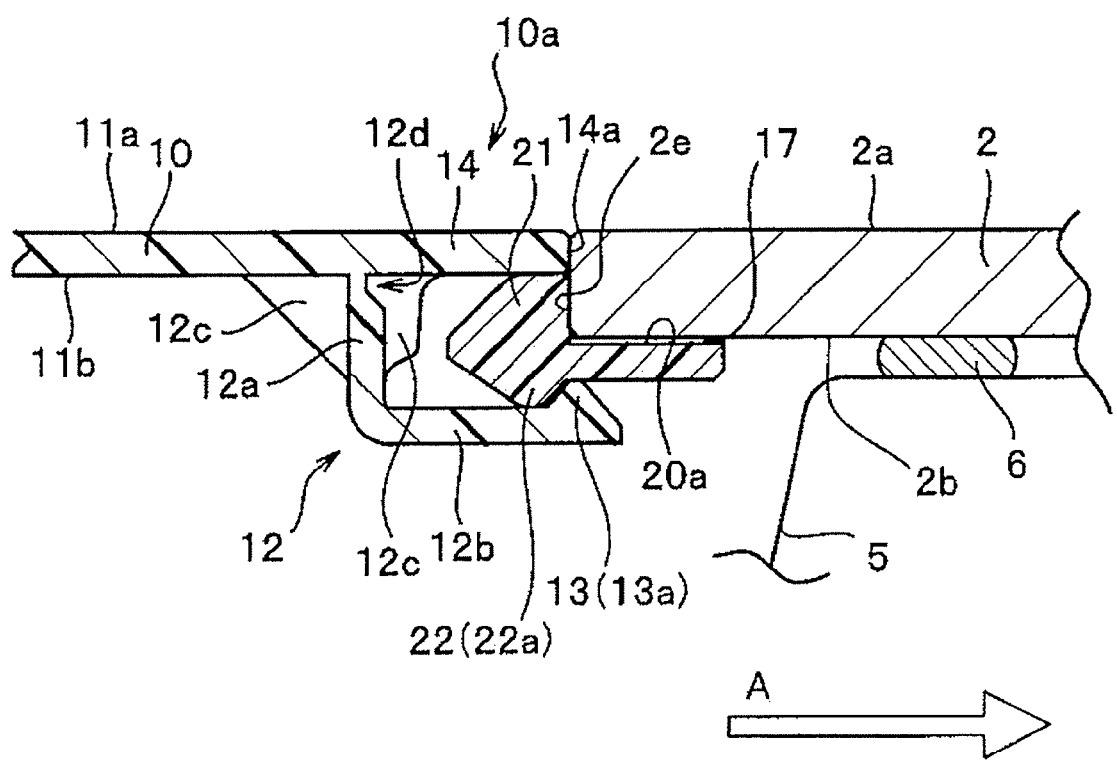
FIG. 3 is a sectional view of essential portions of a cowl-top cover and a front glass (the first embodiment).

As shown in FIG. 2 and FIG. 3 that is an enlarged view of essential portions of FIG. 2, an adhesive agent 17 is arranged between the back face 2b on the lower end side of the front glass 2 and a fixing face 20a of the clip member 20, and the clip member 20 is fixed to the back face 2b of the front glass 2 by means of the adhesive agent 17. In the clip member 20, a protrusion portion 21 that is erected upward from the fixing face 20a is formed, and when the clip member 20 is fixed to a lower end of the front glass 2 via the adhesive agent 17, the protrusion portion 21 is arranged in a state in which it is in abutment against an end face 2e of the front glass lower end 2c. As the adhesive agent 17, a gel-like or liquid-like adhesive liquid or a double-sided tape or the like can be used.

The cowl-top cover 10 is formed by means of molding processing employing a synthetic resin material, and is formed as an elongated resin molding article that is integrally formed so as to be elastically deformable after being ejection-molded by employing a thermoplastic resin such as a polypropylene (PP), acrylonitrile/butadiene/styrene copolymer (ABS), or alternatively, a polyamide-based synthetic resin, for example.

The clip member 20 is molded by means of molding processing employing a synthetic resin or a rubber material, and is formed as an elongated resin molding article that is integrally formed so as to be elastically deformable after being ejection-molded by employing a thermoplastic resin or a rubber material such as polypropylene (PP), polyvinyl chloride (PVC), an acrylonitrile/butadiene/styrene copolymer (ABS), or alternatively, a polyamide-based synthetic resin or a rubber material, for example.

On the front end side of the clip member 20, a step difference portion 22a is formed so as to be reversely oriented from the protrusion portion 21 and formed downward. By means of the step difference portion 22a, a target engagement portion 22 in the clip member 20 is constituted. With the target engagement portion 22 of the clip member 20, an engagement portion 13 of the cowl-top cover 10 can be engaged.

As shown in FIG. 2 and FIG. 3, the cowl-top cover 10 is obtained as a constituent element having a bonding portion 14 that is provided to extend on the side of the front glass 2 and a tongue piece 12 that is formed on a back face 11b. The bonding portion 14 is provided to extend on the side of the rear end part 10a of the cowl-top cover 10 toward the side of the front glass 2, and in the tongue piece 12, a sectional shape in the forward and backward direction of the vehicle 1 has a substantial L Shape, and a free end side of the L shape is formed toward the side of the front glass 2.

Figure 4:
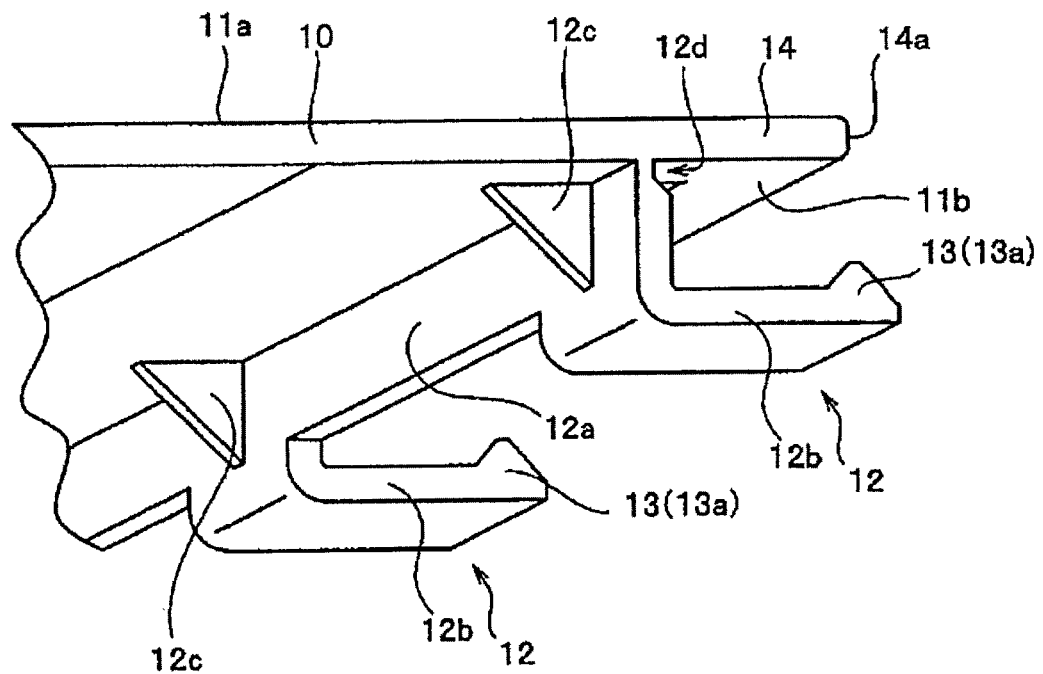
FIG. 4 is a perspective view of essential portions of a cowl-top cover (the first embodiment).

As shown in FIG. 4 that is a perspective view when the side of the rear end part 10a of the cowl-top cover 10 is seen from the side of the back face 11b, the tongue piece 12 is formed as a constituent element having a longitudinal wall 12a that is erected downward from the back face 11b of the cowl-top cover 10 and a bent piece 12b that is bent from a lower end of the longitudinal wall 12a, the bent piece being provided to extend on a rearward side of the cowl-top cover 10.

A substantial L shape is formed of the longitudinal wall 12a and the bent piece 12b, and the bent piece 12b is formed in a shape having a L-shaped free end, and is formed in a shape in which a free end side is oriented to the side of the front glass 2. In a construction example shown in FIG. 4, the longitudinal wall 12a is formed as a continuous construction taken along the vehicle widthwise direction, and the bent piece 12b is formed as a layout construction that is spaced at predetermined intervals with respect to the vehicle widthwise direction. However, the construction of the tongue piece 12 can be formed as a layout construction in which the longitudinal wall 12a and the bent piece 12b are integrally formed with each other, and are spaced from each other at predetermined intervals with respect to the vehicle widthwise direction. Alternatively, the bent piece 12b can be formed as a continuous construction taken along the vehicle widthwise direction in a manner similar to that in the longitudinal wall 12a.

As shown in FIG. 2 to FIG. 4, a narrow part 12d is formed at a bonding portion between the back face 11b of the cowl-top cover 10 and an upper end of the longitudinal wall 12a. The narrow part 12d is formed, thereby making it possible to prevent an occurrence of a failure in external view such as a recess after ejection molding in a surface site of the cowl-top cover 10 that forms the longitudinal wall 12a. In addition, in order to increase strength of the longitudinal wall 12a, a rib 12c is formed between the longitudinal wall 12a and the back face 11b of the cowl-top cover 10. The rib 12c is formed in correspondence with a site adapted to form the bent pieces 12b that are formed at predetermined intervals in the vehicle widthwise direction of the cowl-top cover 10.

The rib 12c can be formed on each of the front side and the rear side of the longitudinal wall 12a or can be formed either the front side or the rear side of the longitudinal wall 12a. In addition, this rib can also be formed so that a position in the vehicle widthwise direction of the rib 12c that is formed on the front side of the longitudinal wall 12a and a position in the vehicle widthwise direction of the rib 12c that is formed on the rear side of the longitudinal wall 12a is be identical to each other in the vehicle widthwise direction, or alternatively, is different from each other.

At a free end of the bent piece 12b, a protrusion portion 13a that protrudes upward is formed, and is constructed as an engagement portion 13 when the cowl-top cover 10 is engaged with the target engagement portion 22 of the clip member 20. While the cowl-top cover 10 is moved along a lengthwise direction of the front glass 2, the protrusion portion 13a is engaged with the step difference portion 22a that is the target engagement portion 22, whereby the cowl-top cover 10 can be mounted on the front glass 2.

At this time, while carrying out elastic deformation, the bent piece 12b causes the protrusion portion 13a that is formed at the free end of the bent piece 12b to slip on an oblique face of the step difference portion 22a, making it possible to engage with the step difference portion 22a. When the protrusion portion 13a moves to an engagement position while slipping on the oblique face of the step difference portion 22a, a force in the direction indicated by the arrow A of FIG. 3 is caused to act on the clip member 20.

However, the protrusion portion 21 abuts against an end face 2e of the front glass lower end and thus the force in the direction indicated by the arrow A, acting on the clip member 20, is restrained by means of the protrusion portion 21, making it possible to prevent a shear stress from acting on the adhesive agent 17. In addition, release of the adhesive agent 17 can be prevented. Therefore, the clip member 20 can be securely fixed to the front glass 2, and the work of mounting the cowl-top cover 10 to the front glass 2 can be smoothly carried out.

In addition, an engagement direction between the cowl-top cover 10 and the clip member 20 is identical to an engagement direction taken along a lengthwise direction of the front glass 2 and thus even if a vehicle body panel is constructed as a reinforce material, the cowl-top cover 10 can be engaged with the clip member 20.

When the protrusion portion 13a of the cowl-top cover 10 and the step difference portion 22a of the clip member 20 engage with each other, a rear end face 14a of the cowl-top cover 10 that is provided to extend on a rear side is in abutment against the end face 2e of the front glass lower end. Moreover, the surface 11a of the cowl-top cover 10 and the surface 2a of the front glass 2 are arranged to be flush with each other, and no gap is formed between the cowl-top cover 10 and the front glass 2. In addition, an external view in the boundary portion between the cowl-top cover 10 and the front glass 2 can be improved.

[Second Embodiment]

Figure 5:
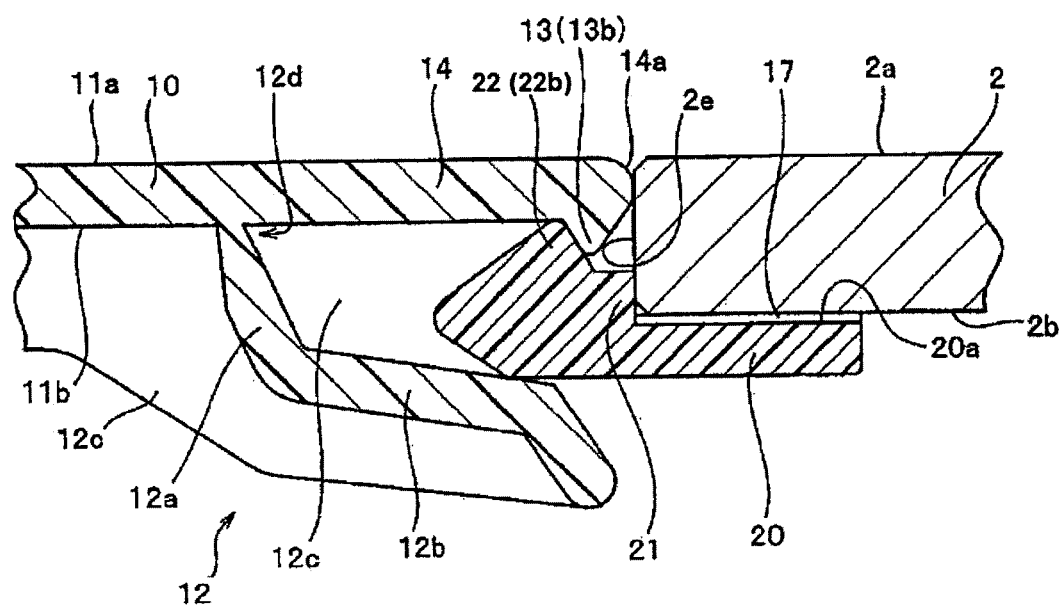
FIG. 5 is a sectional view of essential portions of another cowl-top cover and a front glass (a second embodiment).

A second embodiment is directed to a construction in which an engagement portion of a cowl-top cover is engaged with a step difference portion that is formed in a clip member as is the case with the first embodiment, and is directed to a modification example of the embodiment, and its related description will be given with reference to FIG. 5 to FIG. 7. In a construction example shown in FIG. 5, a target engagement portion 22 in a clip member 20 is formed as a step difference portion 22b that protrudes upward, and an engagement portion 13 of a cowl-top cover 10, which engages with the step difference portion 22b, is formed in a downward shape in a rear end of a bonding portion 14 of the cowl-top cover 10. In addition, when the cowl-top cover 10 engages with the clip member 20, a bent piece 12b of a tongue piece 12 upward compresses a bottom face of a front end side of the clip member 20, and holds the clip member 20 between the bent piece and the engagement portion 13. Other constituent elements are similar to those in the first embodiment, and like constituent elements in the first embodiment are designated by like reference numerals, and a duplicate description thereof is not given.

When the cowl-top cover 10 engages with the clip member 20, a rear end face 14a of the cowl-top cover 10 abuts against an end face 2e of a front glass 2, and a surface 11a of the cowl-top cover 10 and a surface 2a of the front glass 2 are arranged to be flush with each other.

Figure 6:
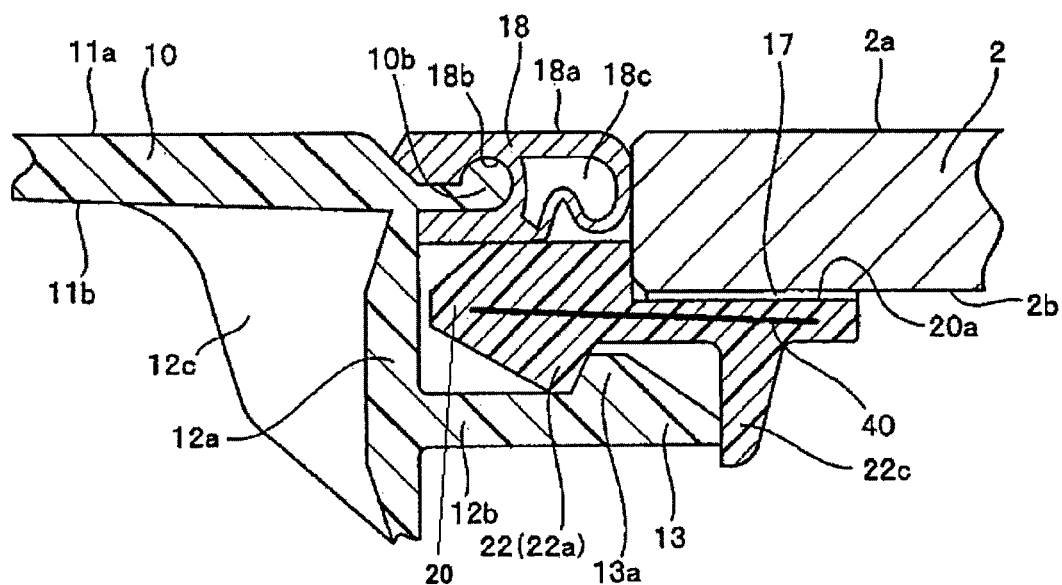
FIG. 6 is a sectional view of essential portions of still another cowl-top cover and a front glass (the second embodiment).

In a construction example shown in FIG. 6, a soft member 18 is interposed between the cowl-top cover 10 and the front glass 2, and in the clip member 20, a reinforce core material 40 is provided in order to improve strength. In addition, a stopper 22c adapted to restrain a rear end face of a bent piece 12b is formed at the clip member 20. Other constituent elements are similar to those in the first embodiment, and like constituent elements in the first embodiment are designated by like reference numerals, and a duplicate description thereof is not given.

The soft member 18 is made of a material having an elastic force such as rubber, an engagement recessed portion 18b is formed on a front end side, and a hollow portion 18c is formed on a rear end side. The engagement recessed portion 18b is engaged with an engagement protrusion portion 10b that is formed in the cowl-top cover 10, whereby the soft member 18 can be mounted on the cowl-top cover 10.

The reinforce core material 40 is integrally molded with a synthetic resin material when the clip member 20 is molded. As the reinforce core material 40, a belt material made of an aluminum material or a steel material can be employed, and a thickness of the belt material can be defined as a thickness from which a desired elastic force can be obtained.

When the cowl-top cover 10 is mounted on the front glass 2, the cowl-top cover 10 can be abutted against the end face 2e of the front glass 2 via the soft member 18. At this time, the hollow portion 18c is deformed, and an intimacy can be significantly enhanced between the cowl-top cover 10 and the front glass 2.

When the cowl-top cover 10 is mounted on the front glass 2, the cowl-top cover 10 engages therewith while moving along the lengthwise direction of the front glass 2. However, the soft member 18 is arranged in a movement direction of the cowl-top cover 10, thus making it possible to mitigate a shock against the front glass 2, which can occur at the time of mounting the cowl-top cover by means of the soft member 18. In addition, the soft member 18 elastically abuts against the front glass 2, thus making it possible to prevent an occurrence of a gap or exposure of noise produced at the time of vehicle running to the outside. It is to be noted that a description will be given with respect to a shape of the soft member 18 is constructed to have the hollow portion 18c, whereas when a soft member 18 having its flexibility is employed, the soft member can also be formed as a solid construction in which no hollow portion 18c is formed.

When the cowl-top cover 10 is mounted on the front glass 2, a protrusion portion 13a that is formed in the bent piece 12b moves to an engagement position while slipping on an oblique face of a step difference portion 22a of the clip member 20. In addition, after the protrusion portion 13a has rolled over the step difference portion 22a of the clip member 20, a given engaged state is established. When the protrusion portion 13a is in its engaged state after rolling over the step difference portion 22a, a rear end face of the protrusion portion 13a abuts against a stopper 22c that is erected downward from the clip member 20. The protrusion portion 13a abuts against the stopper 22c, whereby the cowl-top cover 10 is restrained from further movement. In addition, if the protrusion portion 13a is held between the step difference portion 22a and the stopper 22c, a given mounted state of the cowl-top cover 10 can be firmly maintained.

When the cowl-top cover 10 is mounted on the front glass 2, a surface 11a of the cowl-top cover 10, the surface 2a of the front glass 2, and a surface 18a of the soft member 18 are arranged to be flush with each other. In addition, a back face of the soft member 18 and a surface of the clip member 20 are in abutment against each other, and the soft member 18 functions as a seal with the clip member 20.

FIG. 6 shows a state in which a back face of the soft member 18 and a surface of the clip member 20 abut against each other, whereas it is possible to construct a gap so as to be formed between the back face of the soft member 18 and the surface of the clip member 20.

Figure 7:
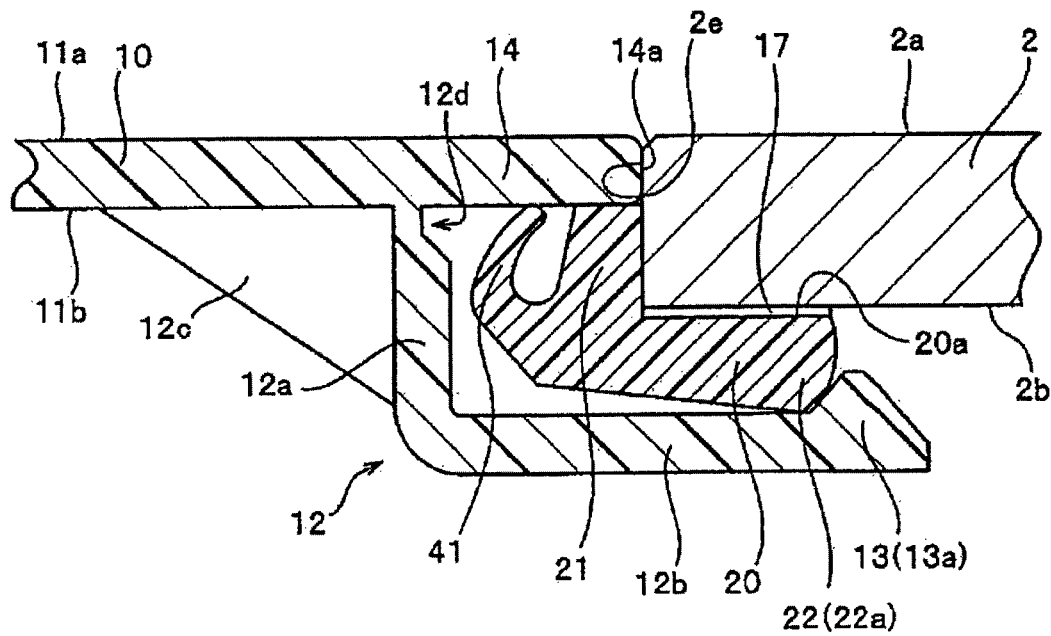
FIG. 7 is a sectional view of essential portions of a cowl-top cover and a front glass employing a soft member (the second embodiment).

In a construction example shown in FIG. 7, a seal portion 41 is constructed to be arranged between the clip member 20 and the cowl-top cover 10. Other constituent elements are similar to those in the first embodiment, and like constituent elements in the first embodiment are designated by like reference numerals, and a duplicate description thereof is not given.

A seal portion 41 is constructed by forming an end part on a front end side of the clip member 20 in a thin shape, and a portion formed in a thin shape is elastically deformed to thereby seal a portion between the clip member 20 and the back face 11b of the cowl-top cover 10. FIG. 7 shows a state in which the protrusion portion 21 of the clip member 20 and the back face 11b of the cowl-top cover 10 abut against each other, whereas a gap can be adapted so as to be formed between the protrusion portion 21 and the back face 11b of the cowl-top cover 10. In addition, when the cowl-top cover 10 is mounted on the front glass 2, the surface 11a of the cowl-top cover 10 and the surface 2a of the front glass 2 are arranged to be flush with each other.

[Third Embodiment]

A third embodiment is directed to a construction in which an engagement portion that is formed in a cowl-top cover is held by means of a target engagement portion formed in a clip member, and its related construction example will be described with reference to FIG. 8 to FIG. 10. Those formed in the third embodiment are: a construction in which an engagement portion formed in a cowl-top cover is held by means of a target engagement portion formed in a clip member; and a construction in which a reinforce core material is provided in a clip member in order to obtain a holding force. In addition, a construction that is held by means of a target engagement portion is formed as a constituent element of an engagement portion in a cowl-top cover, and these descriptive matters are different from those in the first embodiment. Other constituent elements are similar to those in the first embodiment, and like constituent elements in the first embodiment are designated by like reference numerals, and a duplicate description thereof is not given.

Figure 8:
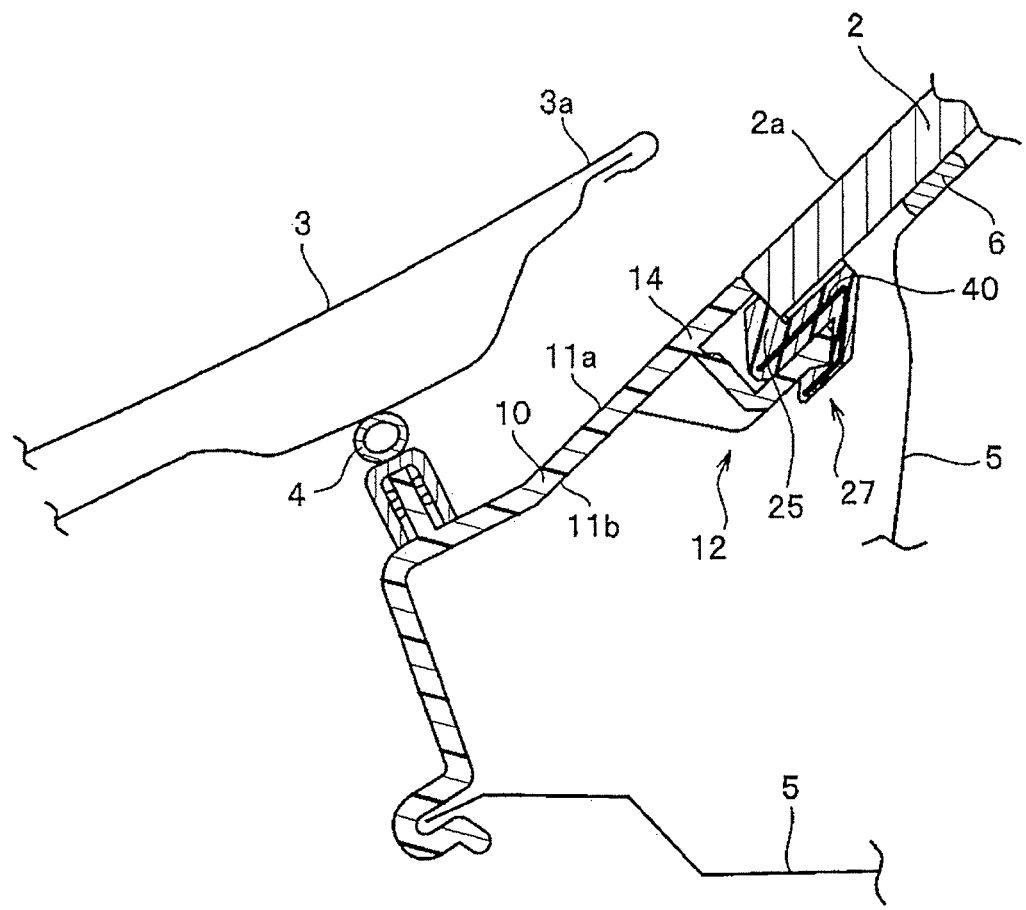
FIG. 8 is a sectional view taken along the line VIII-VIII of FIG. 1, employing a cowl-top cover (a third embodiment).
Figure 9:
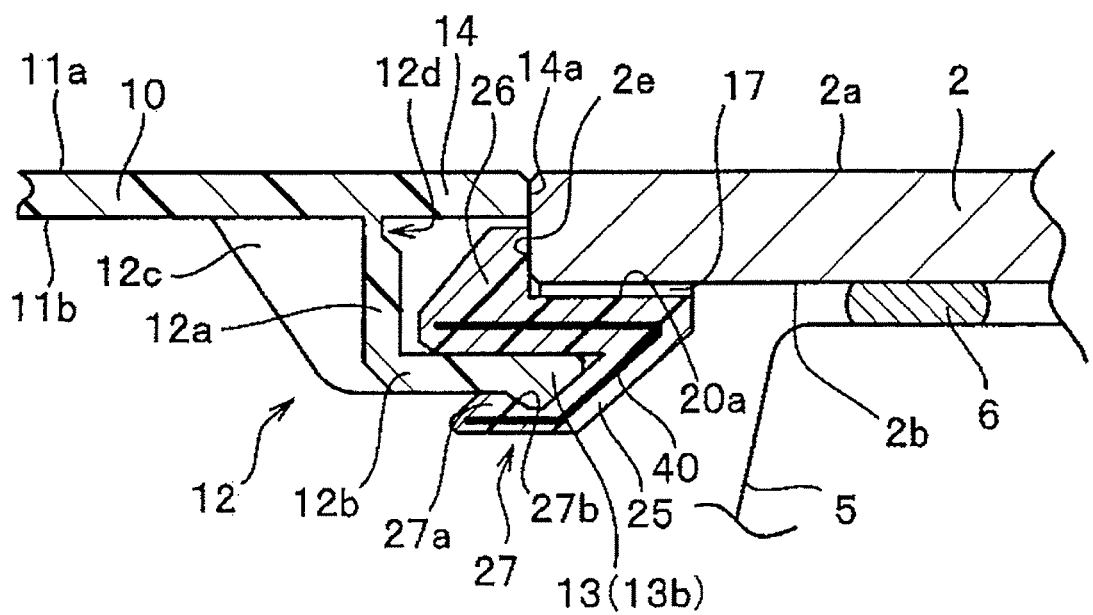
FIG. 9 is a sectional view of essential portions of a cowl-top cover and a front glass (the third embodiment).

As shown in FIG. 8 that is a cross section taken along the line VIII-VII of FIG. 1 and as shown in FIG. 9 that is an enlarged view of essential portions of FIG. 8, a clip member 25 is fixed to a front glass 2 by means of an adhesive agent 17 that is arranged between a back face 2b of a front glass lower end 2c and a fixed surface 20a of the clip member 25. In addition, on a back face side of the clip member 25, a target engagement portion 27 is formed so that a cross section in the forward and backward direction of a vehicle 1 is formed in a substantially U-shaped mode. The target engagement portion 27 is provided to extend downward from the clip member 25, and a free end side is adapted to be bent toward a front side of the vehicle.

An engagement portion 13 that is formed in the cowl-top cover 10 can be held by means of the substantially U-shaped cross section that constitutes the target engagement portion 27. That is, an engagement recessed portion 27b that is adapted to hold and house a protrusion portion 13b of the cowl-top cover 10 and a protrusion portion 27a engaging with the protrusion portion 13b are constructed by means of the substantially U-shaped cross section. In addition, in order to increase a holding force in the target engagement portion 27, a reinforce core material 40 taken along the substantial U-shaped cross section is provided in the clip member 25.

Figure 10:
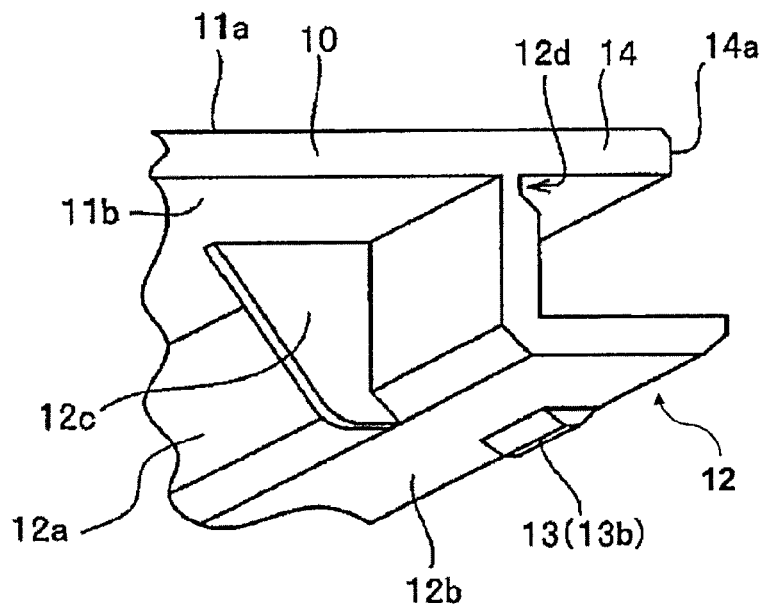
FIG. 10 is a perspective view of essential portions of a cowl-top cover (the third embodiment).

As shown in FIG. 10, on a back face of the cowl-top cover 10, a tongue piece 12 is formed, and the tongue piece 12 is constricted to have a longitudinal wall 12a that is provided to extend in a vehicle widthwise direction and a bent piece 12b that is provided to extend so as to be bent from a lower end of the longitudinal wall 12a to a vehicle rearward side. On the back face side of the bent piece 12b, a protrusion portion 13b is formed at predetermined intervals in the vehicle widthwise direction. The protrusion portion 13b is formed in a shape that is protruded downward from a back face of the bent piece 12b, constituting an engagement portion 13 in the cowl-top cover 10.

When the protrusion portion 13b is held and engaged by means of the engagement recessed portion 27b of the target engagement portion 27, the target engagement portion 27 of the clip member 25 is deformed so as to expand an open end side of the engagement recessed portion 27b. After the protrusion portion 13b has been housed in to engagement recessed portion 27b, the target engagement portion 27 that has been elastically deformed is elastically restored, and the open end side of the engagement recessed portion 27b is narrowed. In order to assist a series of such movement of the target engagement portion, a reinforce core material 40 that is integrally molded is provided in the clip member 25.

While a description has been given with respect to a case in which the tongue piece 12 forming the engagement portion 13 is constricted in a continuous shape in the vehicle widthwise direction, a layout construction can be provided in such a manner that a longitudinal wall 12a and a bent piece 12b constituting the tongue piece 12 are spaced from each other at predetermined intervals in the vehicle widthwise direction.

In a state in which the cowl-top cover 10 is mounted on the front glass 2, a surface 11a of the cowl-top cover 10 and a surface 2a of the front glass 2 are arranged to be flush with each other.

[Fourth Embodiment]

Figure 11:
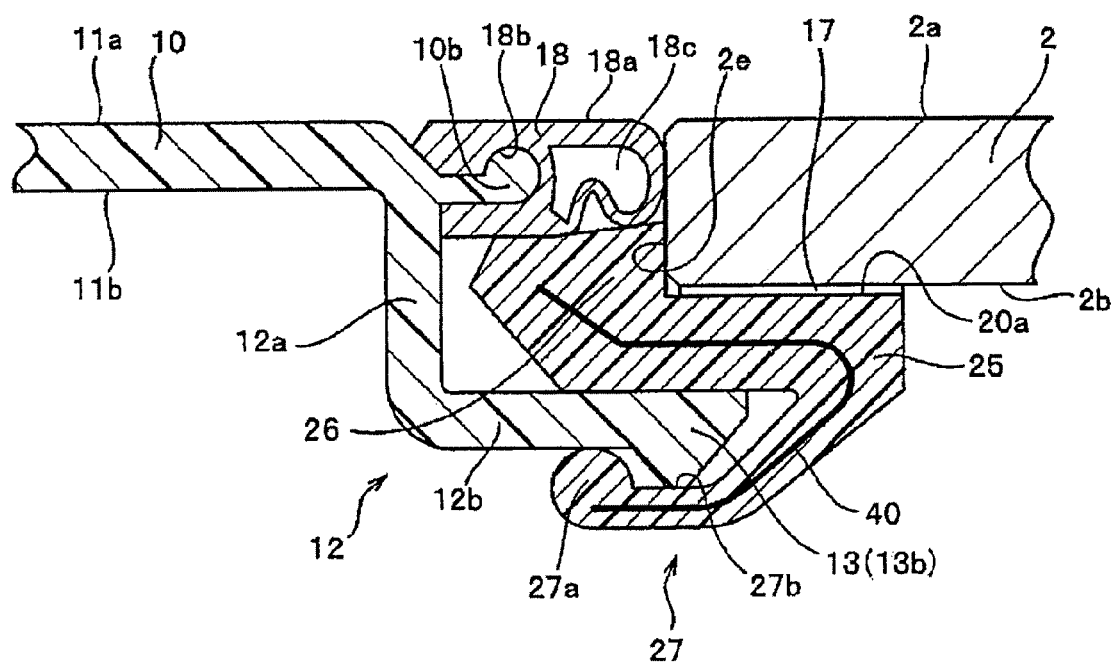
FIG. 11 is a sectional view of essential portions of another cowl-top cover and a front glass (a fourth embodiment).

A fourth embodiment is directed to a construction in which an engagement portion is engaged with a step difference portion that is formed in a clip member in a manner similar to that in the third embodiment, and is directed to a modification example thereof, and its related description will be given with reference to FIG. 11 to FIG. 13. FIG. 11 shows a construction example in which a soft member 18 is employed between a cowl-top cover 10 and a front glass 2, and FIG. 12 and FIG. 13 each show a construction example in which a seal portion 41 is arranged between a clip member 25 and the cowl-top cover 10. In the fourth embodiment, like constituent elements of the first to third embodiments are designated by like reference numerals, and a duplicate description of these constituent elements is not given.

In a construction example shown in FIG. 11, the soft member 18 is interposed between the cowl-top cover 10 and the front glass 2, and in the clip member 25, a reinforce core material 40 is provided in order to improve strength. The soft member 18 is made of a material having an elastic force such as a rubber, an engagement recessed portion 18b is formed on a front end side, and a hollow portion 18c is formed on a rear end side. The engagement recessed portion 18b is engaged with an engagement protrusion portion 10b that is formed in the cowl-top cover 10, whereby the soft member 18 can be mounted on the cowl-top cover 10. The reinforce core material 40 is integrally molded with a synthetic resin material when the clip member 25 is molded.

When the cowl-top cover 10 is mounted on the front glass 2, the cowl-top cover 10 is capable of abutting against an end face 2e of the front glass 2 via the soft member 18. At this time, an intimacy between the cowl-top cover 10 and the front glass 2 can be significantly enhanced by means of the soft member 18. In addition, when the cowl-top cover 10 is mounted on the front glass 2, the cowl-top cover engages therewith while moving along a lengthwise direction of the front glass 2, whereas the hollow portion 18c of the soft member 18 is deformed, whereby a shock on the front glass 2 can be mitigated.

When the cowl-top cover 10 is mounted on the front glass 2, a protrusion portion 13b that is formed in a bent piece 12b comes into sliding contact with a protrusion portion 27a that is formed on a front end of a substantially U-shaped target engagement portion 27, and at the same time, the protrusion portion is expanded while elastically deforming an open end side of the engagement recessed portion 27b. In addition, when the protrusion portion 13b is housed in the engagement recessed portion 27b, the open end side of the engagement recessed portion 27b is elastically restored, and is narrowed until its original state is established. In the illustrative example, a bent piece 12b of a tongue piece 12 is held between the protrusion portion 27a and the back face side of the clip member 25.

In addition, when the cowl-top cover 10 is mounted on the front glass 2, a surface 11a of the cowl-top cover 10, a surface 2a of the front glass 2, and a surface 18a of the soft member 18 are arranged to be flush with each other. Further, a back face of the soft member 18 and a surface of the clip member 25 are in abutment against each other, and the soft member 18 functions as a seal associated with the clip member 25.

While FIG. 11 shows a state in which the back face of the soft member 18 and the surface of the clip member 25 abut against each other, a gap can be constructed so as to be formed between the back face of the soft member 18 and the surface of the clip member 25.

Figure 12:
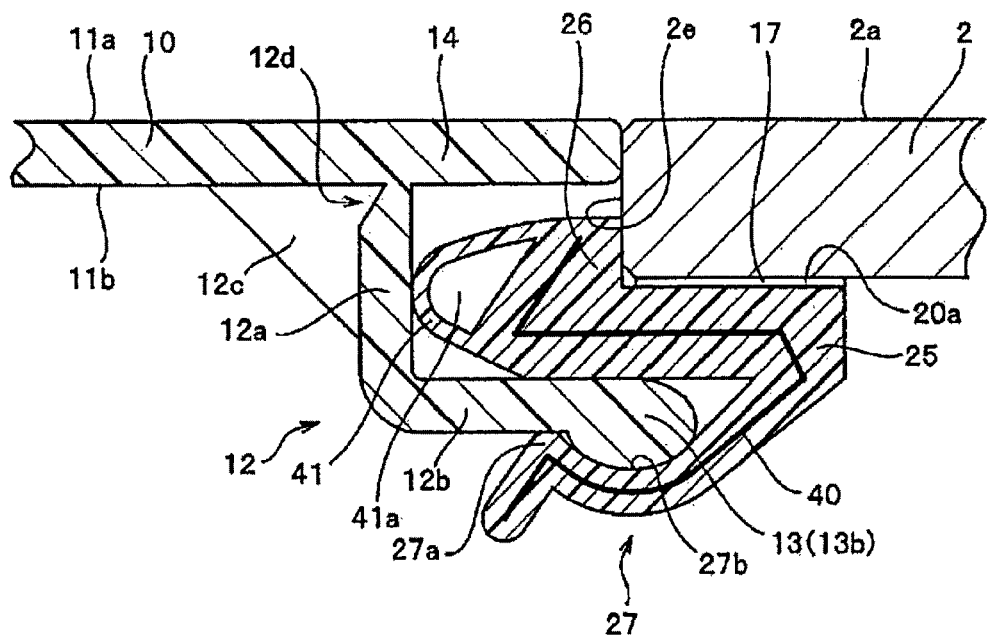
FIG. 12 is a sectional view of essential portions of still another cowl-top cover and a front glass (the fourth embodiment).
Figure 13:
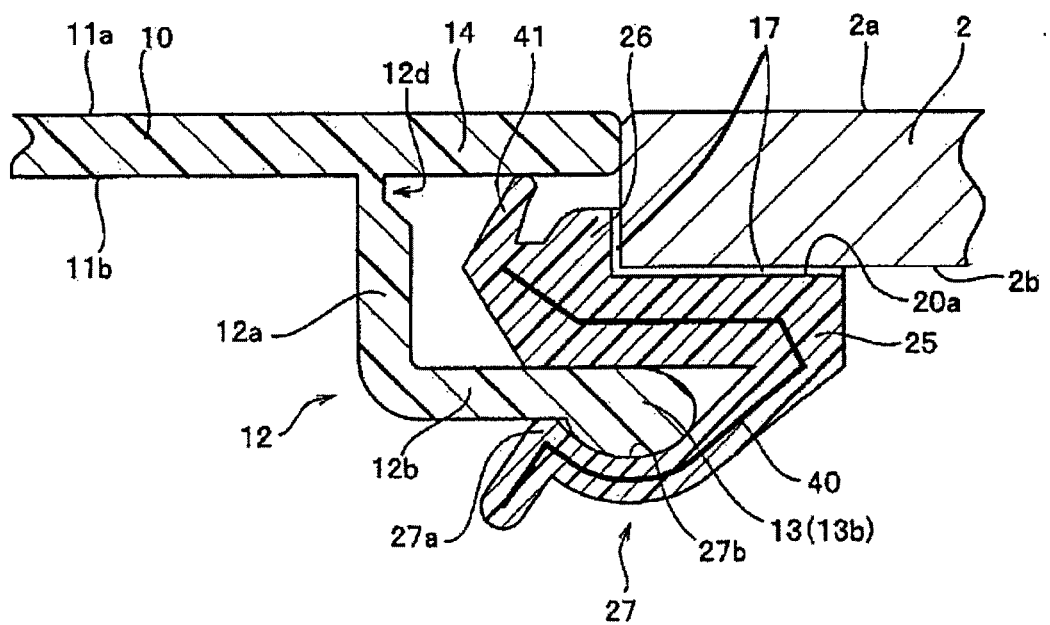
FIG. 13 is a sectional view of essential portions of a cowl-top cover and a front glass employing a soft member (the fourth embodiment).

In construction examples shown in FIG. 12 and FIG. 13, a seal portion 41 is constructed so as to be arranged between the clip member 25 and the cowl-top cover 10. FIG. 12 shows a construction example in which the seal portion 41 comes into intimate contact with a longitudinal wall 12a of a tongue piece 12, and FIG. 13 shows a construction example in which the seal portion 41 comes into intimate contact with a back face 11b of the cowl-top cover 10.

In the construction example of FIG. 12, the seal portion 41 is constructed having a hollow portion 41a on a front end side of the clip member 25, and when the cowl-top cover 10 is mounted on the front glass 2, the hollow portion 41a of the seal portion 41 is elastically deformed, thereby sealing a portion between the clip member 25 and the cowl-top cover 10. In addition, a reinforce core material 40 is provided as a constituent element adapted to assist elastic deformation of the hollow portion 41a of the seal portion 41. Further, the reinforce core material 40 is provided to extend in a site leading up to the inside a protrusion portion 26 so as to support a rearward side of the seal portion 41.

In the construction example of FIG. 13, the seal portion 41 is formed by constructing an end part on the front end side of the clip member 25 in a thin shape. A portion that is formed in the thin shape is elastically deformed to thereby seal a portion between the clip member 25 and the back face 11b of the cowl-top cover 10. In addition, as a constituent element adapted to reinforce a proximal end side of the seal portion 41, the reinforce core material 40 is provided to extend in a site leading up to the proximal end side of the seal portion 41.

FIG. 13 shows a construction in which an adhesive agent 17 adapted to fix the clip member 25 to the front glass 2 is arranged between the protrusion portion 26 and the end face 2e of a front glass lower end other than a fixing face 20a. The adhesive agent 17 can be provided between the fixing face 20a and the back face 2b of the front glass 2 as illustrated in the first to third embodiments, or alternatively, this adhesive agent can be constructed to be arranged between the protrusion portion 26 and the end face 2e of the front glass lower end, as shown in FIG. 13. Therefore, as a means for fixing a clip member in the present invention, the appropriate fixing method described above can be employed.

As shown in FIG. 12 and FIG. 13, in a state in which the cowl-top cover 10 is mounted on the front glass 2, the surface 11a of the cowl-top cover 10 and the surface 2a of the front glass 2 are arranged to be flush with each other.

[Fifth Embodiment]

In a fifth embodiment, a protrusion portion of a clip member is provided to extend upward, and is constructed to be exposed between a cowl-top cover and a front glass. In addition, a layout construction is provided so as to embed a gap between the cowl-top cover and an end face of a front glass lower end by means of a protrusion portion. In this construction, constituent elements are different from those of the first to fourth embodiments described above, whereas other constituent elements are similar to those shown in the first to fourth embodiments. Like constituent elements shown in the first to fourth embodiments are designated by like reference numerals employed in the first to fourth embodiments, a duplicate description of these constituent elements is not given.

Figure 14:
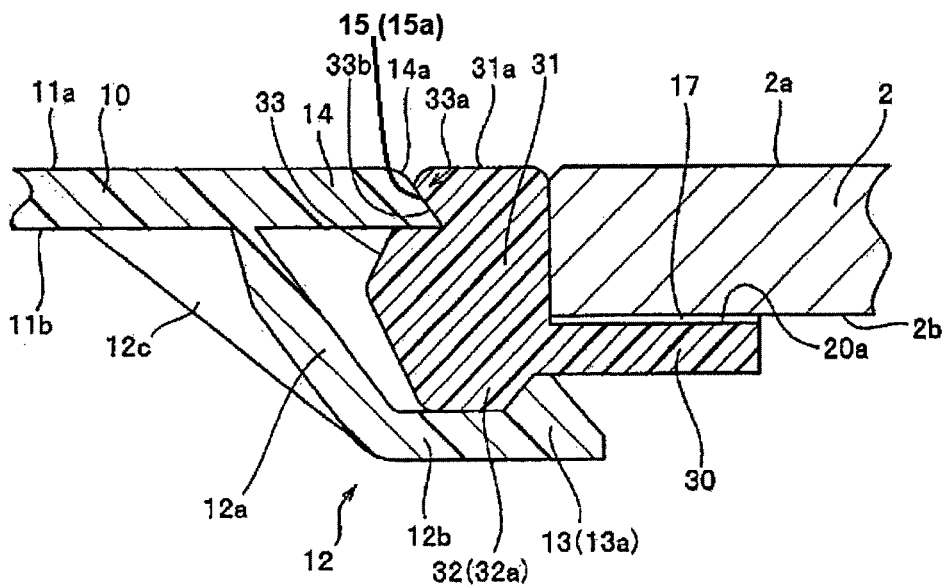
FIG. 14 is a sectional view of essential portions when a protrusion portion is employed to embed a gap between a cowl-top cover and the front glass (a fifth embodiment).

Constructions of the fifth embodiment will be described with reference to FIG. 14 to FIG. 16. A construction shown in FIG. 14 is obtained as a construction employing a clip member 30 having a step difference portion 32a in a manner similar to that in the first embodiment. A protrusion portion 31 in the clip member 30 abuts against an end face 2e of a front glass lower end, and is exposed between a cowl-top cover 10 and a front glass 2.

In addition, when the cowl-top cover 10 is mounted on a surface 31a of the protrusion portion 31, a surface 11a of the cowl-top cover 10, the surface 31a of the protrusion portion 31, and a surface 2a of the front glass 2 are constructed to be flush with each other. With such a construction, the protrusion portion 31 is constructed so as to embed a gap between the cowl-top cover 10 and the front glass 2.

In order to handle a case in which a gap is formed between the cowl-top cover 10 and the clip member 30 due to a manufacturing error or a mounting error of the cowl-top cover 10 or the clip member 30, the shape of a respective one of a abutment face 33 and an abutment face 15 abutting against each other in opposite thereto between the protrusion portion 31 and the cowl-top cover 10 is formed as being a shape having a tilt faces 33b and 15a that are tilted along a forward and backward direction of a vehicle.

That is, in the abutment face 33 against the cowl-top cover 10 on a front face side of the protrusion portion 31, a cutout 33a opening to a frontward side is formed along a vehicle widthwise direction. In addition, a rear end face 14a in a bonding portion 14 of the cowl-top cover 10 is constructed as an abutment face against the abutment face 33 of the protrusion portion 31. Moreover, the shape of the rear end face 14a of the cowl-top cover 10 is formed as a tilt face so as to be opposed to the tilt face 33b that is formed in the cutout 33a.

With such a construction, a part of the rear end face 14a of the bonding portion 14 can be inserted into the cutout 33a of the protrusion portion 31. When a manufacturing error or a mounting error or the like of the cowl-top cover 10 or the clip member 30 does not occur, a part of the rear end face 14a of the bonding portion 14 is engaged into the cutout 33a.

When a manufacturing error or a mounting error or the like occurs, a gap is produced between the rear end face 14a of the bonding portion 14 and a tilt face 33b in the cutout 33a, whereas this gap is obtained as a gap that is obliquely tilted along the tilt face 33b and a tilt face of the rear end face 14a. Therefore, if this gap is seen from an upper side, a shallow gap in depth is visually recognized. In this manner, it is possible to restrain degradation of the external view in a boundary portion between the cowl-top cover 10 and the protrusion portion 31.

Figure 15:
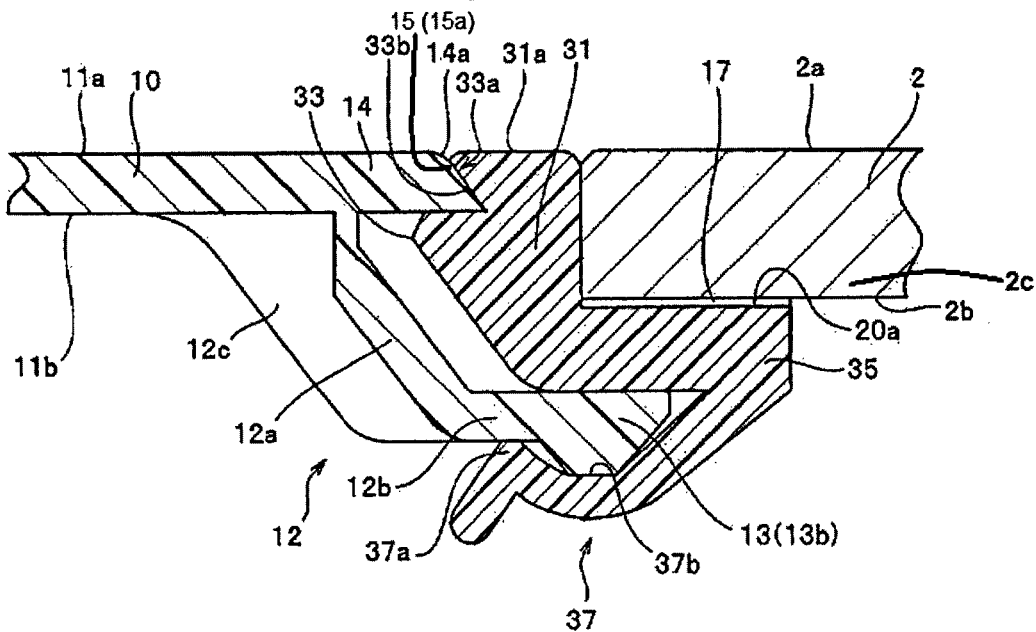
FIG. 15 is another sectional view of essential portions when a protrusion portion is employed to embed a gap between a cowl-top cover and the front glass (the fifth embodiment).

While the construction shown in FIG. 15 is similar to that shown in FIG. 14 described above, a clip member 35 is constructed to hold an engagement portion 13 that is formed in the cowl-top cover 10 by means of a target engagement portion 37 that is formed in the clip member 35 in place of the construction having the step difference portion 32a as shown in FIG. 14. Other constituent elements are similar to those shown in FIG. 14, like constituent elements shown in FIG. 14 are designated by like reference numerals, and a duplicate description of these constituent elements is not given.

In the target engagement portion 37 that is formed on a back face side of the clip member 35, a cross section in the forward and backward direction of the vehicle 1 is formed in a substantial U shape. The target engagement portion 37 is provided to extend downward from the clip member 35, and is constructed so that a free end side is bent toward a front side of the vehicle. A fixing face 20a of the clip member 35 is fixed to a back face 2b of a front glass lower end 2c by means of an adhesive agent 17.

Those which are formed by means of a substantially U-shaped cross section that constitutes a target engagement portion 27 are: an engagement recessed portion 37b adapted to hold and house a protrusion portion 13b constituting an engagement portion 13 of the cowl-top cover 10; and an engagement protrusion portion 37a adapted to engage with the protrusion portion 13b. Although an illustrative example shows a construction in which no reinforce core material is employed, as shown in FIG. 11 or the like, a reinforce core material can be provided in the clip member 35 in order to increase a holding force in the target engagement portion 37.

When the protrusion portion 13b that is formed in a tongue piece 12 of the cowl-top cover 10 is held and engaged by means of the engagement protrusion portion 37a and the engagement recessed portion 37b of the target engagement portion 37, a part of a rear end face 14a of a bonding portion 14 can be inserted into a cutout 33a of a protrusion portion 31. In addition, when a manufacturing error or a mounting error or the like of the cowl-top cover 10 or the clip member 30 does not occur, a part of the rear end face 14a of the bonding portion 14 is engaged into the cutout 33a.

When the cowl-top cover 10 is mounted on a front glass 2, a surface 11a of the cowl-top cover 10, a surface 31a of the protrusion portion 31, and a surface 2a of the front glass 2 can be formed so as to be flush with each other. At this time, a gap between the cowl-top cover 10 and the front glass 2 is formed so as to be embedded with the protrusion portion 31.

Figure 16:
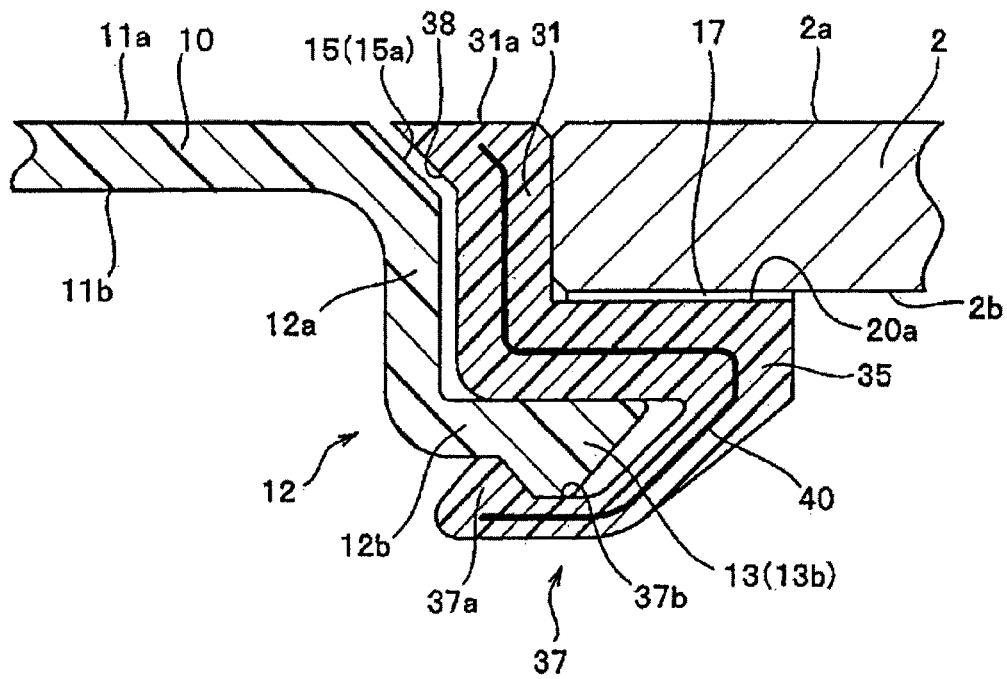
FIG. 16 is still another sectional view of essential portions when a protrusion portion is employed to embed a gap between a cowl-top cover and the front glass (the fifth embodiment).
Figure 17:
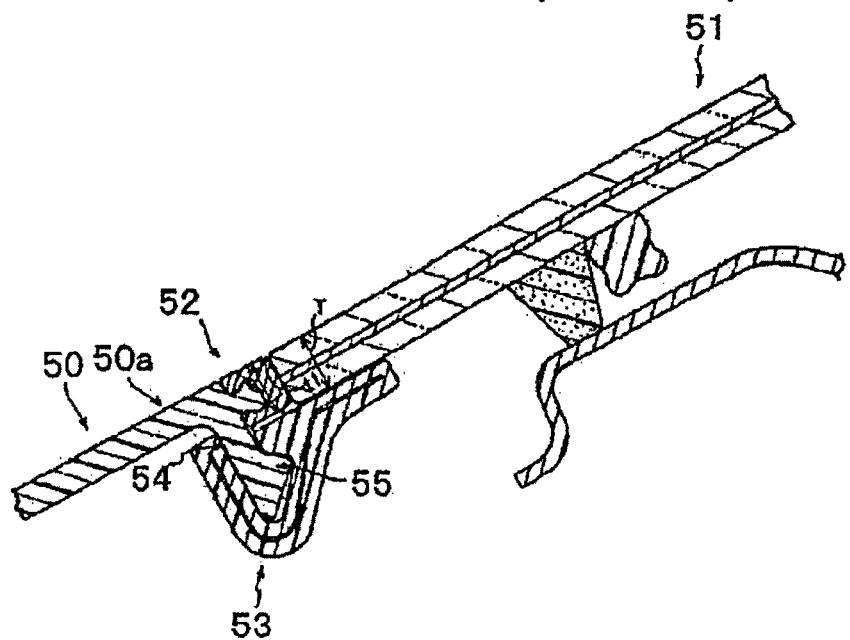
FIG. 17 is a sectional view of essential portions of a cowl-louver main body and a window shield glass (the related art).
Figure 18:
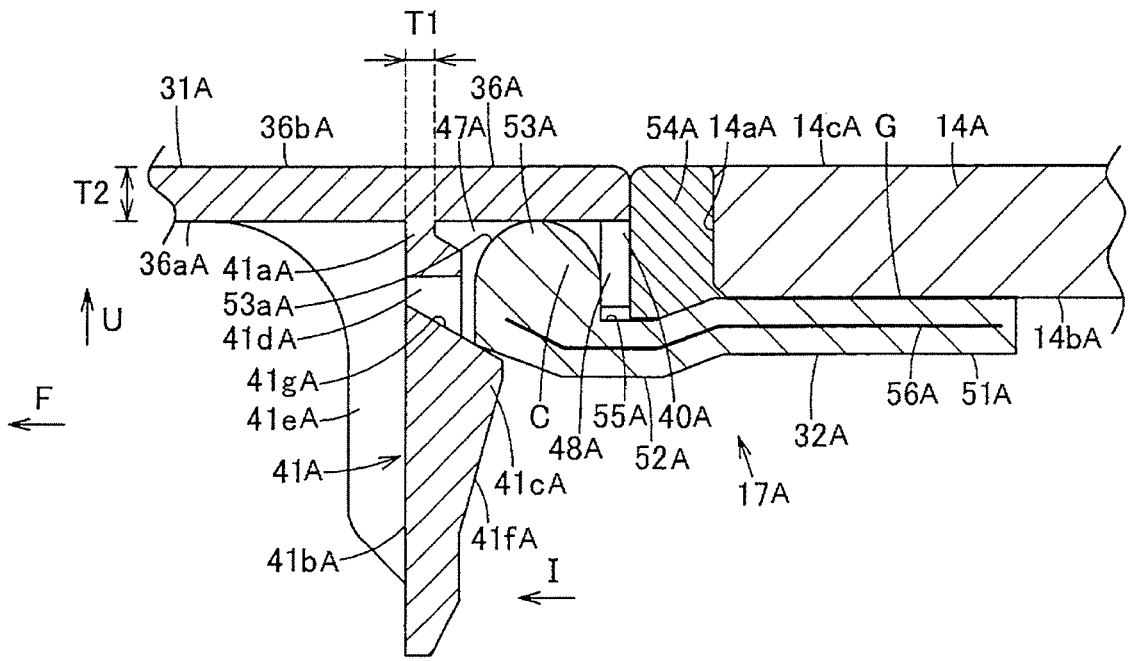
FIG. 18 is a longitudinal cross section showing a part of a sixth embodiment of a cowl-cover device of the present invention.

The construction shown in FIG. 16 is similar to that of the target engagement portion 37 shown in FIG. 15 as described above, whereas no cutout is formed in the clip member 35, and instead, a front end face side of the clip member 35 is formed on a tilt face, and this tilt face is constructed as an abutment face 38. In addition, in the cowl-top cover 10, an abutment face 15 is formed so as to be opposed to an abutment face 38.

In FIG. 16, the bonding portion 14 shown in FIG. 14 and FIG. 15 is not formed, and a tong piece 12 is constructed so as to be directly formed from the surface 11a of the cowl-top cover 10. In addition, the abutment face 15 is formed in a bent portion from the surface 11a of the cowl-top cover 10 to the tongue piece 12.

It is to be noted that in the construction shown in FIG. 16, as shown in FIG. 14 and FIG. 15, the bonding portion 14 can be constructed in such a manner as to be provided to extend in the cowl-top cover 10 or the rear end face 14a in the bonding portion 14 can be constructed as the abutment face 15.

When the engagement portion 13 of the cowl-top cover 10 is engaged with the target engagement portion 37 of the clip member 35, the abutment face 15 of the cowl-top cover 10 abuts against the abutment face 38 of the clip member 35, and the cowl-top cover 10 can be mounted on the front glass 2 without producing a gap between the cowl-top cover 10 and the clip member 35.

However, when a manufacturing error or a mounting error or the like of the cowl-top cover 10 or the clip member 30 occurs, as shown in FIG. 16 a gap may be produced between the abutment face 15 of the cowl-top cover 10 and the abutment face 38 of the clip member 35. Even in such a case, the gap between the abutment face 15 and the abutment face 38 is formed in the shape of a gap that is obliquely tilted along the tilt face 15. Therefore, if this gap is seen from an upward side, a shallow gap in depth is visually recognized, thus making it possible to restrain degradation of the external view in the boundary portion between the cowl-top cover 10 and the protrusion portion 31.

In addition, when the cowl-top cover 10 is mounted on the front glass 2, the surface 11a of the cowl-top cover 10, the surface 31a of the protrusion portion 31, and the surface 2a of the front glass 2 can be constructed so as to be flush with each other. Further, a gap between the cowl-top cover 10 and the front glass 2 can be formed in such a manner as be embedded with the protrusion portion 31.

Hereinafter, sixth to thirteenth embodiments of a cowl-cover device of the present invention will be described with reference to the drawings. The present invention relates to a cowl-top cover mounting structure that is provided with a cowl-top cover for covering a cowl portion between a window shield and a vehicle body member.

Figure 19:
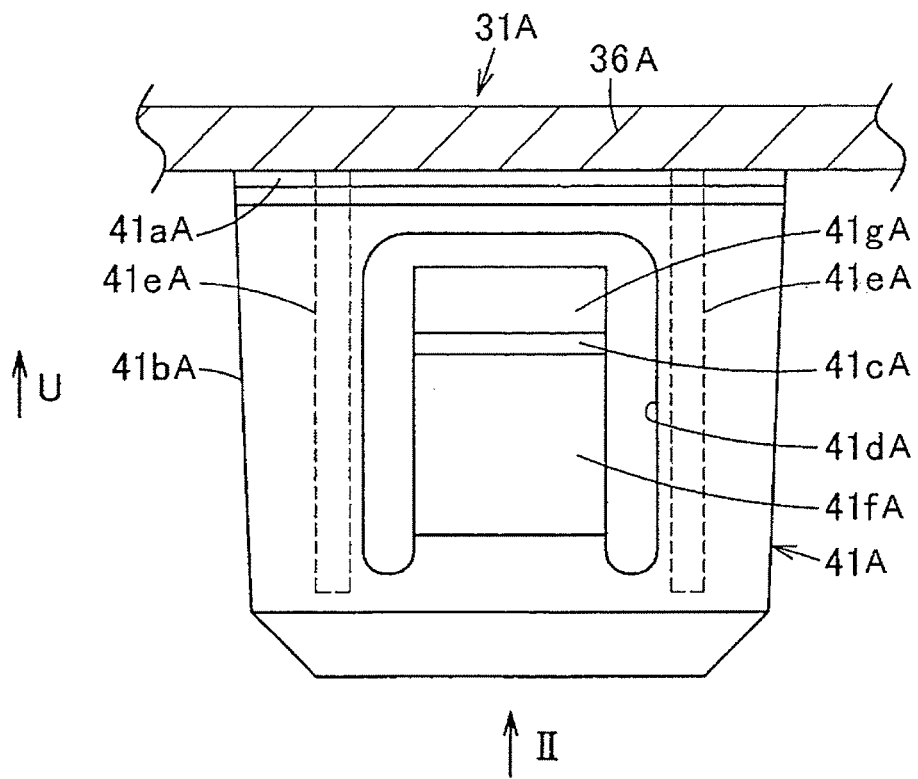
FIG. 19 is a view taken along the line indicated by arrow I of FIG. 18.
Figure 20:
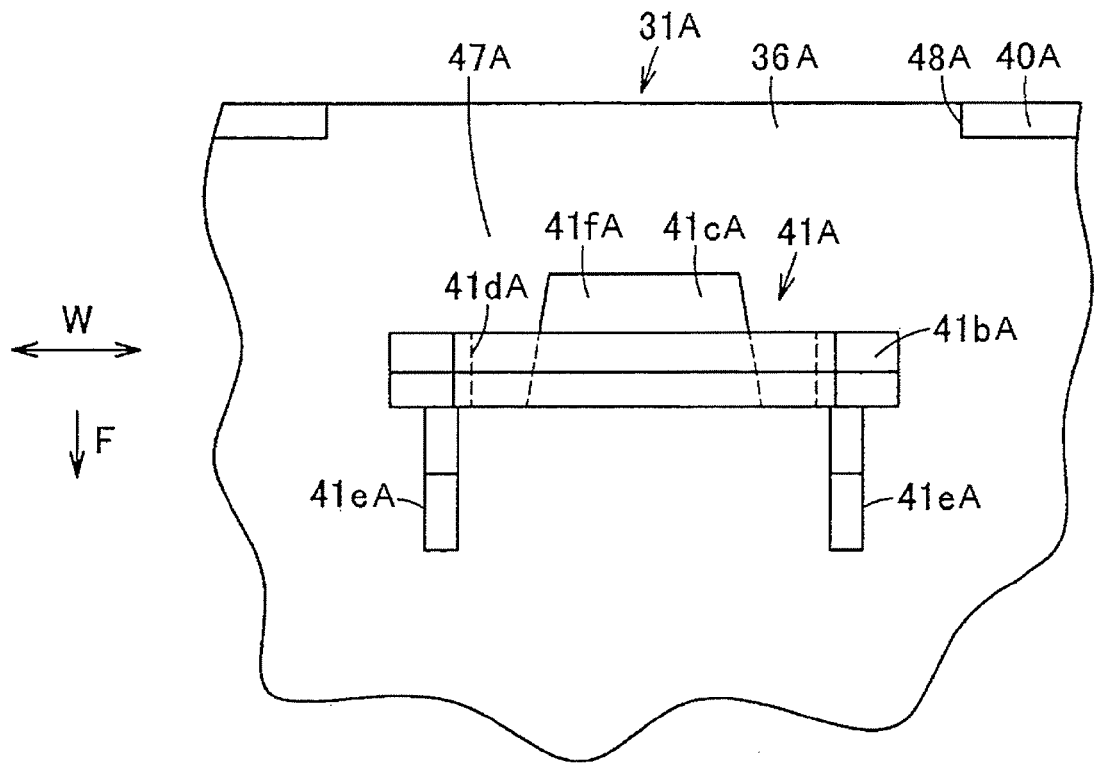
FIG. 20 is a view taken along the line indicated by the arrow II of FIG. 19.

Conventionally, there has been employed a cowl-top cover that is a cowl cover which is disposed in a window shield of a vehicle, that is, so called cowl portion between a front end part of a front glass and a rear end part of a front hood, and which covers this cowl portion to thereby improve its related external view. Such a cowl-top cover is integrally formed of a synthetic resin, and is provided with a cover main body portion for covering a cowl portion and an engagement stop claw portion that is protrusively provided on a back face side of this cover main body portion, and a claw portion is protrusively provided in this engagingly stop claw portion. In addition, the engagingly stop claw portion of this cowl-top cover is compressed and inserted into an opening portion that opens on a front glass surface side of a spacer that serves as a receptacle member that is mounted on an end part of a front glass, whereby the cowl-top cover is engagingly stopped at the spacer by means of the claw portion, and is assembled (refer to Japanese Unexamined Patent Application Publication No. 2003-532574 (pages 10 to 12 and FIG. 19)).

In the case of the construction described in Japanese Unexamined Patent Application Publication No. 2003-532574 mentioned above, an engaging stop claw portion is formed in a so called arrowhead shape in which a proximal end side narrows, and a claw portion side swells to both of the forward and backward side, and in an opening portion of a spacer, a key-shaped claw portion is formed to engage, from both of the forward and backward sides, with a narrow portion on the proximal end side of the engagingly stop claw portion. Therefore, when the cowl-top cover is demounted, a strong load is applied to the engagingly stop claw portion and moreover, if there occurs a dimensional deviation in cowl-top cover or spacer, a stress is prone to concentrate on the narrow portion on the proximal end side of the engagingly stop claw portion that is inserted into the opening portion at the time of assembling. In addition, in order to improve strength of the engagingly stop claw portion, it is considered to increase a plate thickness on the proximal end side of the engagingly stop claw portion; and however, in such a case, a molding failure (shrink) occurs with the surface side of the cover main body portion, and there is an apprehension that its related external view is degraded.

On the other hand, in order to eliminate the molding failure (shrink) on the surface side of the cover main body portion, it is considered to increase a plate thickness of the whole cowl-top cover; and however, in this case, an increase in weight of the cowl-top cover occurs.

The present invention has been made in view of such a circumstance, and it is an object of the present invention to provide a cowl-top cover mounting structure that is capable of improving the reliability of an engagingly stop claw portion without a need to worry about degradation of its related external view.

The present invention provides a cowl cover device that is capable of improving reliability of an engagingly stop claw portion without a need to worry about degradation of its related external view. A cowl-top cover 31A of the present invention has a cover main body portion 36A for covering a cowl portion between a front glass 14A and a vehicle body panel. The cowl-top cover 31A has an engagingly stop claw portion 41A that is protrusively provided on the side of a back face 36aA of the cover main body portion 36A. The engagingly stop claw portion 41A has a claw portion 41cA on a rear side. A spacer 32A is adapted to securely fix a target securely fixing portion 51A on the side of a back face 14bA of an edge part 14aA of the front glass 14A. The spacer 32A is adapted to protrusively provide an engagement portion 53A for the claw portion 41cA to engage with the target securing fixing portion 51A.

[Sixth Embodiment]

Hereinafter, a sixth embodiment will be described.

Figure 21:
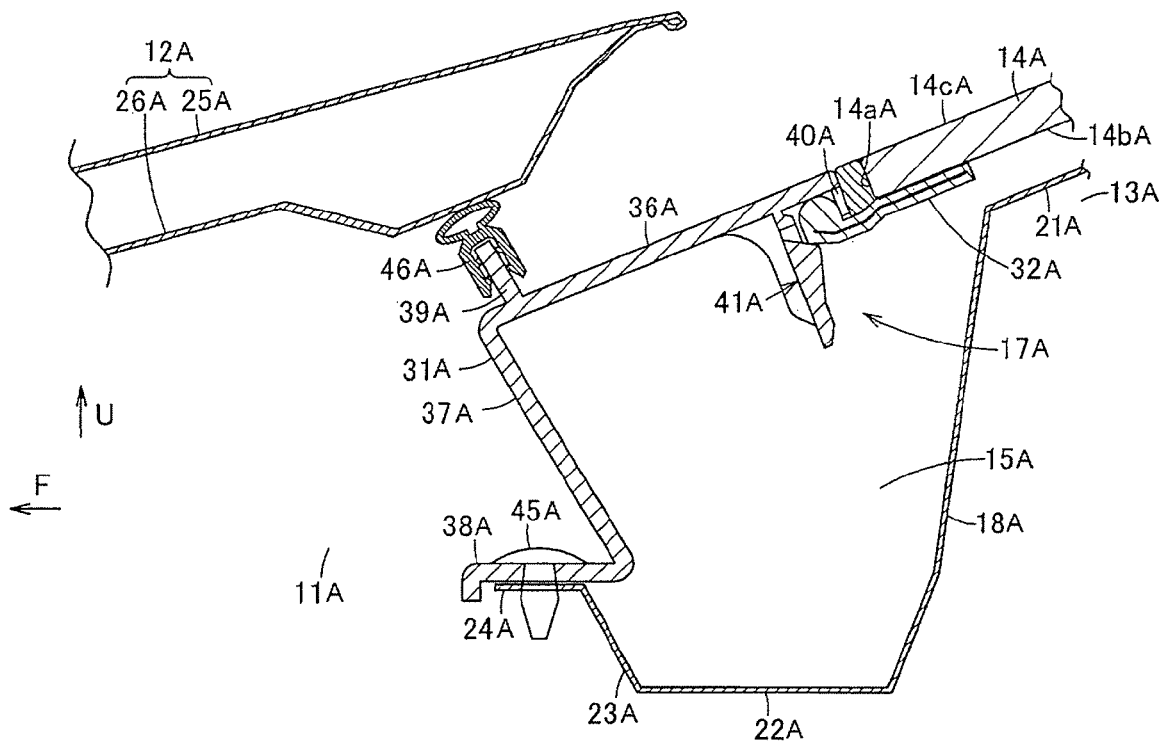
FIG. 21 is a longitudinal cross section showing a part of a vehicle with which the same cowl-cover device is assembled.
Figure 22:
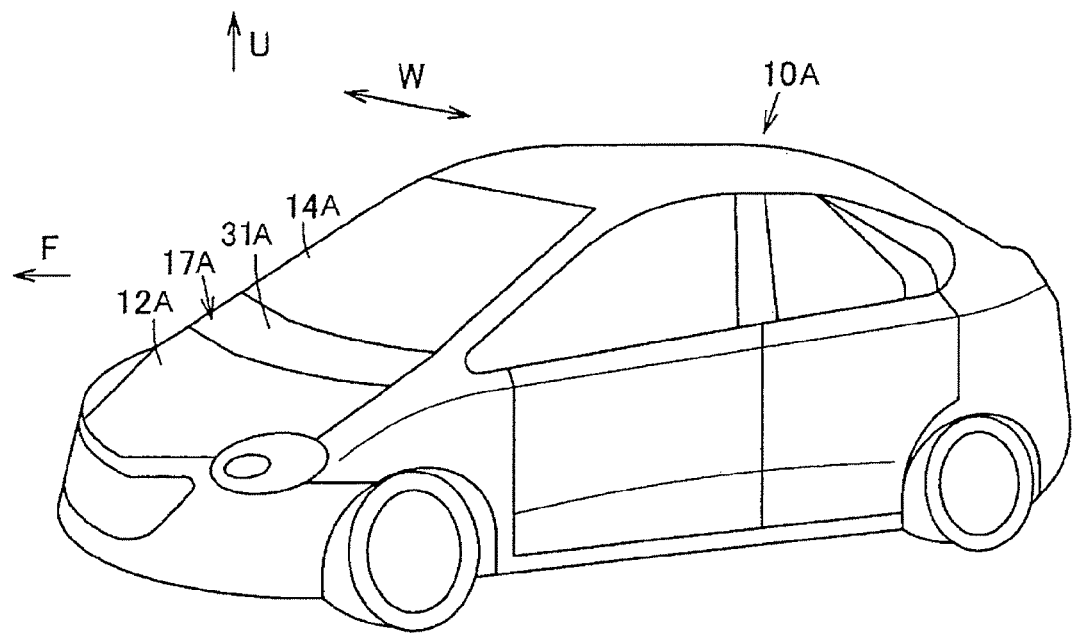
FIG. 22 is a perspective view showing an external view of the vehicle.

In FIG. 21 and FIG. 22, reference numeral 10A designates a vehicle body of an automobile that is a vehicle, and on this vehicle body 10A, a cowl-cover device 17A is mounted on cover a cowl portion 15A between: a front hood 12A serving as a hood that is a counterpart member for covering an engine room 11A; and a front glass 14A that is a glass as a window shield that is positioned on a front side of a vehicle chamber 13A. It is to be noted that hereinafter, directions such as a forward direction (the direction indicated by the arrow F), an upward direction (the direction indicated by the arrow U), and a widthwise direction (the direction indicated by the arrow W) that is a leftward and rightward direction will be described as being defined with reference to a forward direction of the vehicle body 10A.

In addition, this cowl portion 15A is referred to as an air box or the like, is formed in a conduit shape of which an upper side is opened, by a vehicle body panel 18A as a vehicle body member that is formed of an iron plate, and constitutes a vehicle body. At an upper side part of the vehicle body panel 18A, a front glass receptacle portion 21A is provided, and a front glass 14A is fixed to the vehicle body panel 18A by means of a seal material, although not shown, such as an rubber-based adhesive agent coming into intimate contact with liquid tightness, such as a hot melt. In addition, what are provided on this vehicle body panel 18A are: a front plate portion 23A in which a front side part of a bottom plate portion 22A is erected upward on a front side; and a support plate portion 24A in which an upper end part of the front plate portion 23A is a fixed receptacle portion that is provided to extend substantially horizontally on a front side. Further, this cowl portion 15A is a portion to which an air intake portion of an air conditioning device, although not shown, for introducing atmospheric air into the vehicle chamber 13A, is to be connected, and on a right side that is one side of this cowl portion 15A, a motor or the like for driving a wiper aim of a wiper, although not shown, is disposed, and further, at a left side that is the other side of this cowl portion 15A, parts such as batteries are disposed.

In addition, in the front hood 12A, a hood outer portion 25A and a hood inner portion 26A are integrally or separately formed, the outer portion being positioned at an outside, that is, at an upper side in a closed state, the inner portion being positioned inside of this hood outer portion 25A, that is, via a slight gap at a lower side in a closed state.

Further, the cowl cover device 17A, as shown in FIG. 18 to FIG. 22, is adapted to cover a portion between an edge part 14aA on a front end of the front glass 14A and a rear end of the engine room 11A that is positioned forward of this front glass 14A; is also called as a gap sealing device; and is provided with: a cowl-top cover 31A that is a cowl cover; and a spacer 32A as a receptacle member for receiving this cowl top cover 31A.

Furthermore, the cowl-top cover 31A is formed in an elongated (transversely elongated) substantial plate shape in which a widthwise direction W, that is, a vehicle widthwise direction of the vehicle body 10A is defined as a longitudinal direction along the cowl portion 15A, as a whole, so as to improve an external view while covering the cowl portion 15A, that is, an upper side of the vehicle body panel 18A. In addition, this cowl-top cover 31A is integrally formed by ejection molding a thermoplastic resin such as a polypropylene (PP), acrylonitrile / butadiene / styrene copolymer (ABS), or a polyamide-based synthetic resin, for example, employing a die and a slide die that opens in a thickness direction (vertical direction), for example. Further, this cowl-top cover 31A is basically provided with: a cover main body portion 36A that expends in a widthwise direction and a forward and backward direction while covering the cowl portion 15A; a longitudinal wall portion 37A that is continuous to a front end part of this cover main body portion 36A, and that extends in a widthwise direction and a vertical direction; a vehicle body mount portion 38A that is continuous to a lower end part of this longitudinal wall portion 37A, and that is supported by the support plate portion 24A; a seal mount portion 39A that is provided to extend at an upper side from an upper end part of the longitudinal wall portion 37A; a flange portion 40A serving as a positioning portion that is protrusively provided downward from a rear end part of the cover main body portion 36A; and one or a plurality of engagingly stop claw portions 41A that are protrusively provided in proximity to the rear end part of the cover main body portion 36A and downward at a front side of the flange portion 40A.

Moreover, the cover main body portion 36A can be referred to as a cover portion, and a conduit portion for raindrops and drainage taken along the widthwise direction is formed by a plate-shaped upper wall portion, although not shown. In addition, at this upper wall portion, a lattice-shaped air intake opening that is capable of introducing atmospheric air into the lower side of the cowl portion 15A is formed. Further, in the cover main body portion 36A, a cavity portion or a recessed portion is formed in accordance with a shape of a wiper.

Further, a vehicle body mount portion 38A is a substantially horizontal plate-shaped portion to be placed on the support plate portion 24A, and a plurality of mount portions that are formed at predetermined positions are removably fixed to the support plate portion 24A or the like of the vehicle body panel 18A, employing a mount bracket 45A such as resin-based clips or bolts, for example.

Furthermore, the seal mount portion 39A is disposed downward of the front hood 12A, i.e., at a position opposite to a back face, and is formed in a plate shape that is protrusively provided toward an upper side. In addition, at an upper part of this seal mount portion 39A, a cowl-top seal 46A is disposed as a seal member that engages therewith from an upper side, and that is elastically deformable, and this cowl-top seal 46A has a rubber-based or thermoplastic elastomer-based cylindrical portion, for example; comes into intimate contact with the front hood 12A in a closed state with liquid tightness so as to shield hot air or offensive smell from the engine room 11A.

In addition, the flange portion 40A is formed in a plate-shaped portion forming a substantially perpendicular plate shape with respect to the cover main body portion 36A. Therefore, a space portion 47A in which the spacer 32A is to be positioned is formed between the flange portion 40A and the engagingly stop claw portion 41A. Further, in this flange portion 40A, an opening portion 48A is formed at an opposite position to that of the engagingly stop claw portion 41A.

In addition, the engagingly stop claw portion 41A is formed in a plate shape (a tongue piece shape) that is protrusively provided in substantially parallel to the flange portion 40A, that is, in a substantially perpendicular to the cover main body portion 36A, and has a proximal end part 41aA of which a thickness in the forward and backward direction is the smallest, that is, of which a thickness is the smallest; and a tip end side portion more than this proximal end part 41aA is an engagingly stop claw portion main body 41bA of which a thickness in the forward and backward direction is greater than that of this proximal end part 41aA. In this engagingly stop claw portion main body 41bA, on a rear face that is one side face on the side of the front glass 14A, a claw portion 41cA is integrally formed so as to protrude toward a rear side that is on the side of the front glass 14A, and a U-shaped cutout opening portion 41dA is formed in a continuous shape all over each of the left and right sides and an upper side of this claw portion 41cA, the opening portion surrounding each of the left and right sides and the upper side of the claw portion 41cA. In addition, on an opposite face to the front glass 14A (flange portion 40A) and the claw portion 41cA of this engagingly stop claw portion main body 41bA, that is, on a rear face (front face), on each side of the cutout opening portion 41dA, that is, at a position spaced with respect to each side of the claw portion 41cA, a rib 41eA that is a reinforce portion for reinforcement is integrally formed all over the cover main body portion 36A along the vertical direction. It is to be noted that a plate thickness T1 of the proximal end part 41aA of the engagingly stop claw portion 41A is 50% or less of a plate thickness T2 of the cover main body portion 36A, for example (T1≤T2/2).

In addition, the claw portion 41cA is adapted to engagingly stop and fix the cowl-top cover 31A with respect to the spacer 32A. That is, this claw portion 41cA is formed in an undercut shape with respect to a mold release direction of a die for molding the cowl-top cover 31A, and namely, this claw portion is fanned in a shape in which hooking takes place with respect to the die release direction, and which is incapable of mold releasing from a molding die merely by means of extrusion in a mold release direction, and is a single hook with respect to the spacer 32A. It is to be noted that a slide die, although not shown, at the time of molding this claw portion 41cA is ensured rearward in a slide direction by means of the opening portion 48A of the flange portion 40A. In addition, in this claw portion 41cA, both lateral sides and an upper end part are spaced from each other by means of the cutout opening portion 41dA, and a free end shape is formed. Further, in this claw portion 41cA, a lower tilt face 41fA is formed as being a first tilt face that is gradually tilted rearward from a lower end part to an upward side, and an upper tilt face 41gA is formed as being a second tilt face that is tilted forward all over an upper end part of the claw portion 41cA from an upper end of this lower tilt face 41fA.

On the other hand, the spacer 32A is also referred to as a gap sealing member; is formed of a soft and elastic member such as a synthetic resin or a rubber, for example; and is provided with: a target securely fixing portion 51A to be adhesively bonded via an adhesive agent G with the side of the back face 14bA of an edge part 14aA of the front glass 14A; an extension portion 52A that is provided to extend forward from this target securely fixing portion 51A; an engagement portion 53A that is provided at a front end part that is a tip end part of this extension portion 52A; and a soft portion 54A that protrudes upward from the extension portion 52A, and further, between the engagement portion 53A and the soft portion 54A, an insert groove portion 55A is formed as being a groove-shaped positioning groove portion. In addition, inside of this spacer 32A, a reinforce core 56A for reinforcement is embedded.

The target securely fixing portion 51A is formed in a flat shape, and the adhesive agent G is applied to an upper side. It is to be noted that this adhesive agent G is made of a rubber-based material coming into intimate contact with liquid tightness such as a hot melt, for example.

In addition, the extension portion 52A extends from the target securely fixing portion 51A to the forward lower side and then protrudes more forward than the edge part 14aA of the front glass 14A. Further this extension portion is positioned between this edge part 14aA and the flange portion 40A of the cowl-top cover 31A.

Further, the engagement portion 53A is protrusively provided upward from a front end part of the extension portion 52A; an upper end part that is a tip end part is fanned in a sectional circular shape, and serves as an engagement protrusion portion 53aA that is capable of abutting against the flange portion 40A of the cowl-top cover 31A and the back face 36aA of the cover main body portion 36A so that the claw portion 41cA is engaged with a lower part.

Furthermore, the soft portion 54A is integrally molded with the extension portion 52A, for example, with the use of a same material, or alternatively, this soft portion is integrated with the extension portion 52A by means of double color molding with the use of a soft (elastic) material that is different from that for the extension portion 52A, and a solid portion formed in a solid manner is obtained. In addition, this soft portion 54A is held between the edge part 14aA of the front glass 14A and the flange portion 40A of the cowl-top cover 31A, and a gap between the edge part 14aA and the flange portion 40A is closed.

In addition, a lower end part of the flange portion 40A is inserted into the insert groove portion 55A, and a rear end of the cowl-top cover 31A is positioned with respect to the spacer 32A (front glass 14A). That is, this insert groove portion 55A is adapted to position the cowl-top cover 31A in a forward and backward direction.

Further, the reinforce core 56A is formed of a member such as a metal plate, for example, which is greater in rigidity than that of the spacer 32A, and is disposed in a continuous manner all over the extension portion 52A and the engagement portion 53A from the target securely fixing portion 51A. It is to be noted that this reinforce core 56A is not a mandatory constituent element.

Next, a method for assembling the cowl cover device 17A with the vehicle body 10A will be described.

First, the target securely fixing portion 51A of the spacer 32A is securely fixed by means of the adhesive agent G to the side of the back face 14bA of the edge part 14aA on the front end of the front glass 14A that is assembled with the vehicle body 10A. At this time, the spacer 32A can be easily and precisely positioned with respect to the front glass 14A by securely fixing the spacer at a position at which the soft portion 54A is abutted against the edge part 14aA of the front glass 14A.

Next, the cowl-top cover 31A that is molded in advance is positioned in the forward and backward direction by inserting the flange portion 40A into the insert groove portion 55A of the spacer 32A, and is further pushed downward, whereby a lower tilt face 41fA of a rear part of the claw portion 41cA abuts against the engagement portion 53A of the spacer 32A, and further, by means of a tilt of this lower tilt face 41fA, the engagingly stop claw portion 41A elastically turns forward and shrinks, and further, the cowl-top cover 31A is pushed downward, whereby the claw portion 41cA rolls over the engagement portion 53A of the spacer 32A. That is, the position of the spacer 32A abutting against the engagement portion 53A is shifted from the lower tilt face 41fA to the upper tilt face 41gA of the claw portion 41cA, whereby the engagingly stop claw portion 41A turns back to a rear side, and the claw portion 41cA is engaged with a lower part of the engagement portion 53A. Further, this engagement portion 53A is positioned in the space portion 47A and then the engagement portion 53A is vertically held between the engagement protrusion portion 53aA of the engagement portion 53A of the spacer 32A, and furthermore, the flange portion 40A and between the back face 36aA of the cover main body portion 36A and the claw portion 41cA. As a result, in a state in which the cowl-top cover 31A is stopped upward so as not to slip off, the spacer 32A is engagingly stopped at and is fixed to an appropriate site, and the cowl-top cover 31A is positioned in a vertical direction. In this state, the soft portion 54A is interposed between the flange portion 40A of the cowl-top cover 31A and the edge part 14aA of the front glass 14A, its related gap is closed, and the surface 36bA of the cover main body portion 36A is substantially flush with the surface 14cA of the front glass 14A.

In addition, a mount portion of the vehicle body mount portion 38A is fixed to the support plate portion 24A by employing the mount bracket 45A, whereby the cowl-top cover 31A is fixed to the vehicle body panel 18A while covering the cowl portion 15A.

Therefore, according to the embodiment, the claw portion 41cA is provided on a rear face of the engagingly stop claw portion 41A that is protrusively provided on the side of the back face 36aA of the cover main body portion 36A of the cowl-top cover 31A, whereby a rear face side of the claw portion 41cA that is a front side of the engagingly stop claw portion 41A is not constrained to the cover main body portion 36. Thus, it is possible to ensure a relief with respect to a stress concentration to the proximal end part 41aA of the engagingly stop claw portion 41A at the time of engaging the engagingly stop claw portion 41A with the engagement portion 53A of the spacer 32A that is positioned at the edge part 14aA of the front glass 14A, the relief being exerted by a dimensional deviation or the like of the cowl-top cover 31A and the spacer 32A, without a need to increase the plate thickness T1 of the proximal end part 41aA that is continuous to the cover main body portion 36A of the engagingly stop claw portion 41A than necessary. Further, it is possible to provide the reinforce rib 41e on the front face side of the engagingly stop claw portion 41A to thereby ensure strength as well. Therefore, a molding failure such as a shrink due to an increase in plate thickness T1 of the proximal end part 41aA of the engagingly stop claw portion 41A is unlikely to occur with the surface 36bA that is a rear face side of the engagingly stop claw portion 41A of the cover main body portion 36A and then degradation of its related external view can be prevented, and further, breakage or the like of the engagingly stop claw portion 41A can be prevented, making it possible to improve reliability of the engagingly stop claw portion 41A.

Further, it is possible to subject the plate thickness of the proximal end part 41aA of the engagingly stop claw portion 41A to lighting, and an occurrence of a shrink with the surface 36bA of the cover main body portion 36A can be prevented more reliably.

Specifically, the plate thickness T1 of the proximal end part 41aA of the engagingly stop claw portion 41A can be set to 50% or less of the plate thickness T2 of the cover main body portion 36A, making it possible to reliably prevent an occurrence of a shrink with the surface 36bA of the cover main body portion 36A.

In addition, unlike a case of increasing the thickness of the entire cowl-top cover 31A in order to ensure strength of the proximal end part 41aA of the engagingly stop claw portion 41A, there is no need to worry about a case in which a weight of the cowl-top cover 31A may increase more significantly than necessary.

Further, an mounting or demounting force can be easily adjusted by adjusting the strength of the engagingly stop claw portion 41A, i.e., the deformation quantity of the engagingly stop claw portion 41A at the time of assembling the cowl-top cover 31A, and workability of mounting or demounting is improved.

Furthermore, in a case where the cowl-top cover 31A is assumedly fixed so as to be tilted due to a dimensional deviation of the cowl-top cover 31A and the spacer 32A, the cowl-top cover 31A is disposed from its original location more significantly as the cover is spaced from a fixed center C to be fixed by means of the spacer 32A. Therefore, in the embodiment, the claw portion 41cA is formed so as to protrude toward the side of the front glass 14A of the engagingly stop claw portion 41A, whereby even in a case where the cowl-top cover 31A is assumedly fixed so as to be tilted due to a dimensional deviation or the like of the cowl-top cover 31A and the spacer 32A in a state in which affixed center of the cowl-top cover 31A is defined as a position that is more proximal to the front glass 14A, it is possible to restrain a displacement of the cowl-top cover 31A on the side of the front glass 14A. Hence, it is possible to restrain a step difference between the side of the front glass 14A and the side of the cover main body portion 36A of the cowl-top cover 31A, and it is also possible to achieve a flatness from the side of the front glass 14A all over the side of the cowl-top cover 31A, etc., whereby its related external view can be improved more remarkably.

Moreover, the soft portion 54A is protrusively provided in the spacer 32A, whereby the spacer 32A is securely fixed to the front glass 14A at a position at which the soft portion 54A is abutted against the edge part 14aA of the front glass 14A, making it possible to easily and reliably position the spacer 32A in a direction taken along a face of the front glass 14A.

[Seventh Embodiment]

Figure 23:
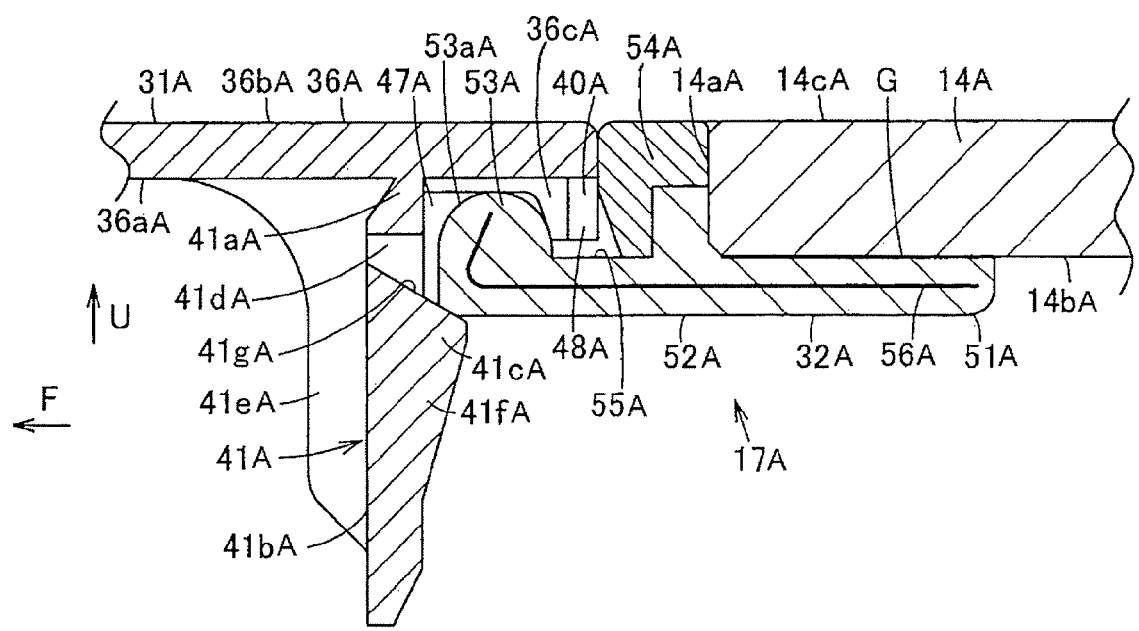
FIG. 23 is a longitudinal cross section showing a part of a seventh embodiment of a cowl-cover device of the present invention.

Next, a seventh embodiment will be described with reference to FIG. 23. It is to be noted that like constituent elements and functions in the sixth embodiment are designated by like reference numerals, and a duplicate description thereof is not given.

In the embodiment, a rib portion 36cA is formed all over between the engagingly stop claw portion 41A and the flange portion 40A the back face 36aA of the cover main body 36A of the cowl-top cover 31A of the sixth embodiment. This rib portion 36cA abuts against an engagement protrusion portion 53aA of an engagement portion 53A of a spacer 32A, thereby setting a position in a vertical direction of the engagement portion 53A of this spacer 32A.

In addition, the cowl-top cover 31A is positioned in a forward and backward direction by inserting the flange portion 40A into an insert groove portion 55A of the spacer 32A, and is pushed further downward, whereby a lower tilt face 41fA at a rear part of a claw portion 41cA abuts against the engagement portion 53A of the spacer 32A. By means of a tilt of the lower tilt face 41fA, the engagingly stop claw portion 41A elastically turns forward and shrinks, and further, the cowl-top cover 31A is pushed downward. In this manner, the claw portion 41cA rolls over the engagement portion 53A of the spacer 32A and then the engagingly stop claw portion 41A turns so as to be restored backward, and the claw portion 41cA is engaged with a lower part of the engagement portion 53A, and further, the cowl-top cover 31A is positioned in a vertical direction.

In this manner, according to the embodiment, the rib portion 36cA that is provided all over between the engagingly stop claw portion 41A and the flange 40A of the back face 36aA of the cover main body portion 36A of the cowl-top cover 31A abuts against the engagement protrusion portion 53aA of the engagement portion 53A of the spacer 32A, whereby a position in a vertical direction of the engagement portion 53A is set. Therefore, the claw portion 41cA engages with this engagement portion 53A, whereby a position in the vertical direction of the cowl-top cover 31A is set and thus the position in the vertical direction of the cowl-top cover 31A can be easily adjusted by adjusting dimensions of this rib portion 36cA.

[Eighth Embodiment]

Figure 24:
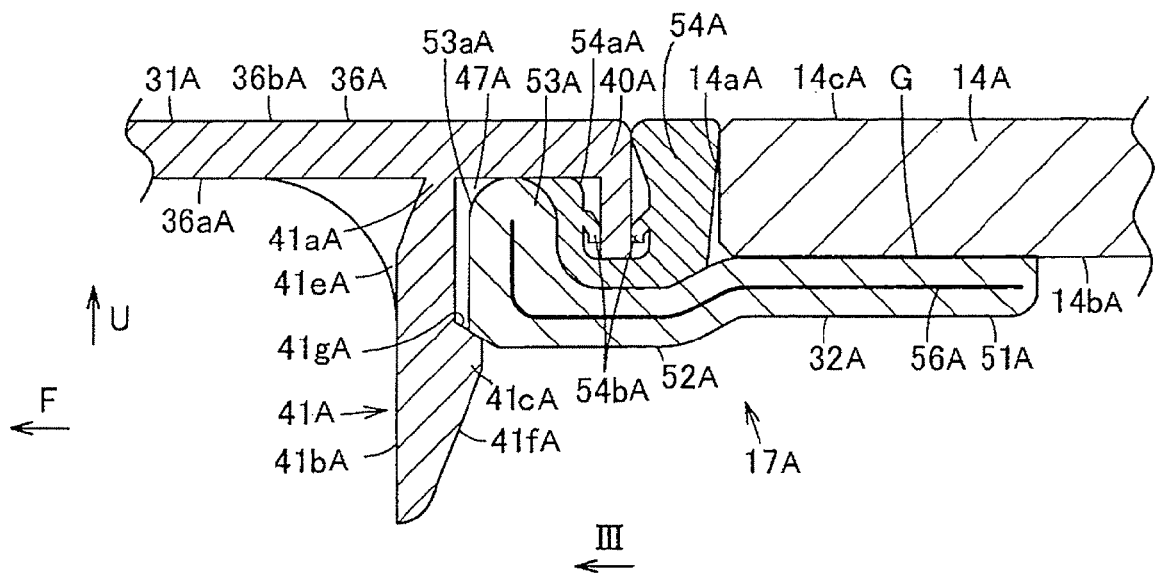
FIG. 24 is a longitudinal cross section showing a part of an eighth embodiment of a cowl-cover device of the present invention.
Figure 25:
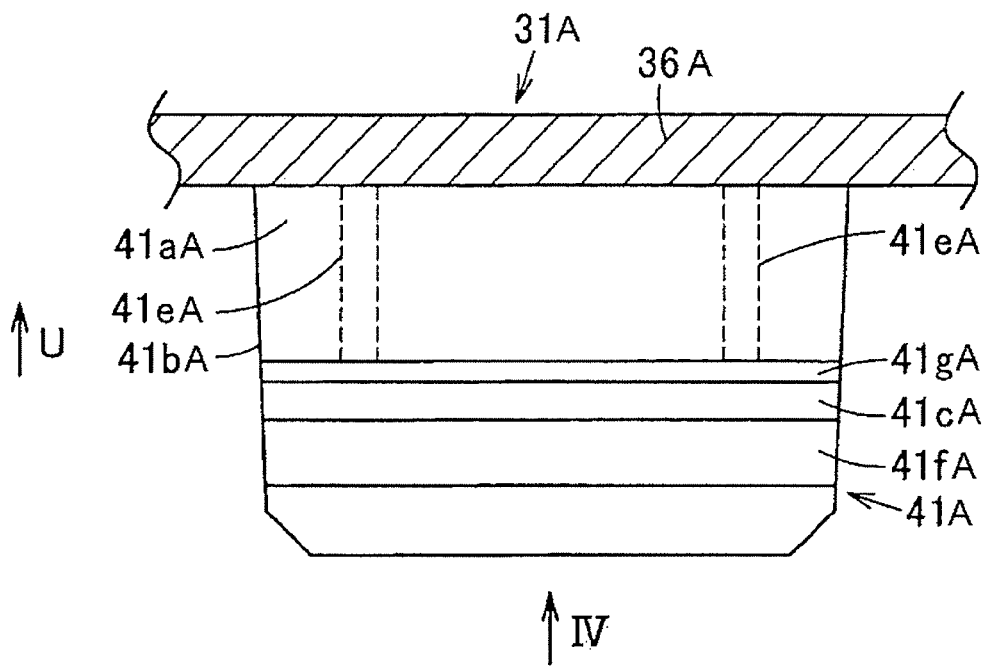
FIG. 25 is a view taken along the line indicated by the arrow III of FIG. 24.
Figure 26:
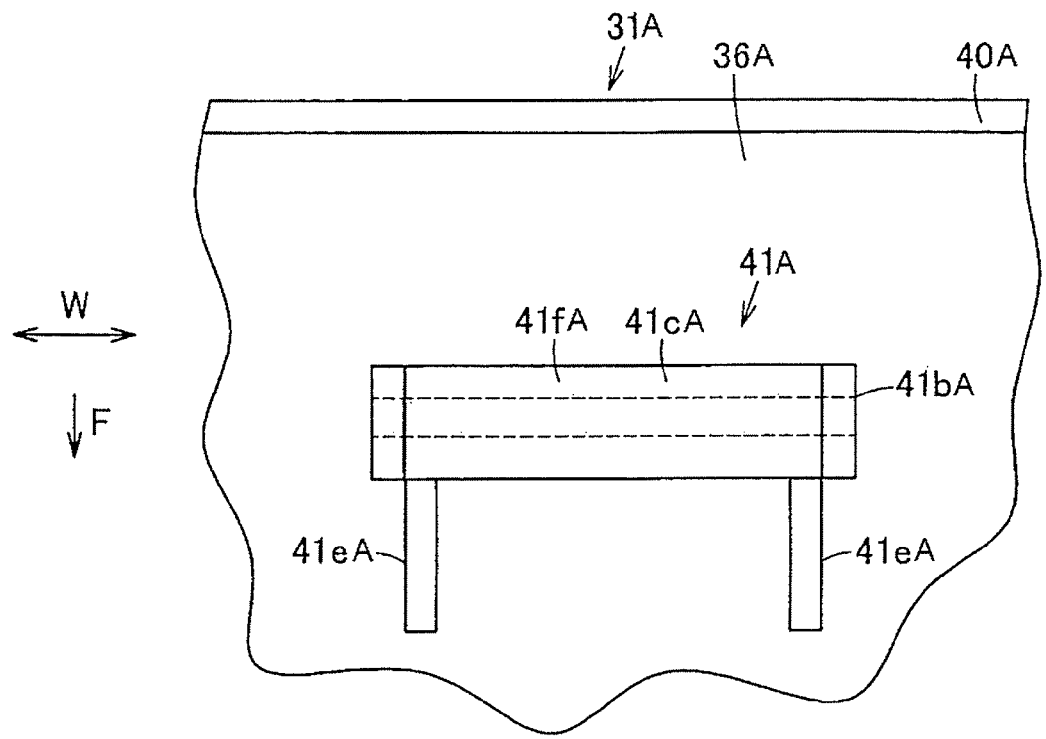
FIG. 26 is a view taken along the line indicated by the arrow IV of FIG. 25.

Next, an eighth embodiment will be described with reference to FIG. 24 to FIG. 26. It is to be noted that like constituent elements and functions in the respective embodiments described above are designated by like reference numerals and a duplicate description thereof is not given.

In the embodiment, a soft portion 54A of the spacer 32A of the sixth embodiment described above is formed at an upper part from an extension portion 52A all over an engagement portion 53A, and at an upper part of this soft portion 54A, a flange portion 40A of the cowl-top cover 31A is inserted into an insert recessed portion 54aA that is a receptacle member positioning groove portion that is provided so as to be recessed in a grooved shape along a transverse direction.

Inside of the insert recessed portion 54aA, a seal lip portions 54bA are protrusively provided forward and backward in parallel to each other, and these seal lip portions 54bA are brought into pressure contact with each other from the front and back sides with respect to the flange portion 40A, whereby this flange portion 40A is adapted so as to be held in the insert recessed portions 54aA and to close a gap between this flange portion 40A and the insert recessed portions 54aA. Therefore, the flange portion 40A is covered with the soft portion 54A.

In addition, the periphery of the claw portion 41cA is not partitioned by means of a cutout opening portion 41dA of the respective embodiments described above, and is protrusively provided in a continuous manner all over in a transverse direction in the engagingly stop claw portion main body 41bA of the engagingly stop claw portion 41A, and on a rear face side thereof, a reinforce rib 41eA is positioned. Therefore, in this claw portion 41cA, a slide die, although not shown, at the time of molding, can be released by sliding the die in the transverse direction along the flange portion 40A. Hence, there is no need for the flange 40A to have an opening portion for releasing a die.

In addition, at the time of assembling the cowl-top cover 31A, the flange portion 40A is inserted into the insert recessed portion 54aA, and is positioned in the forward and backward direction, and the positioned flange portion is pushed further downward, whereby the lower tilt face 41fA at a rear part of the claw portion 41cA abuts against an engagement portion 53A of the spacer 32A. By means of a tilt of the lower tilt face 41fA, the engagingly stop claw portion 41A elastically turns forward and shrinks, and further, the cowl-top cover 31A is pushed downward. In this manner, the claw portion 41cA rolls over the engagement portion 53A of the spacer 32A, the engagingly stop claw portion 41A resiliently turns rearward and shrink, and is engaged with a lower part of the engagement portion 53A. As a result, the cowl-top cover 31A is engagingly stopped at and is locked with the spacer 32A in a state in which the cowl-top cover 31A is stopped upward so as not to slip off.

Therefore, according to the embodiment, the flange portion 40A is covered with the soft portion 54A, whereby a water stop performance is enhanced, making it possible to more reliably prevent entry of an external moisture into the cowl portion 15A and the engine room 11A through a slight gap or the like between the cowl-top cover 31A and the soft portion 54A.

[Ninth Embodiment]

Figure 27:
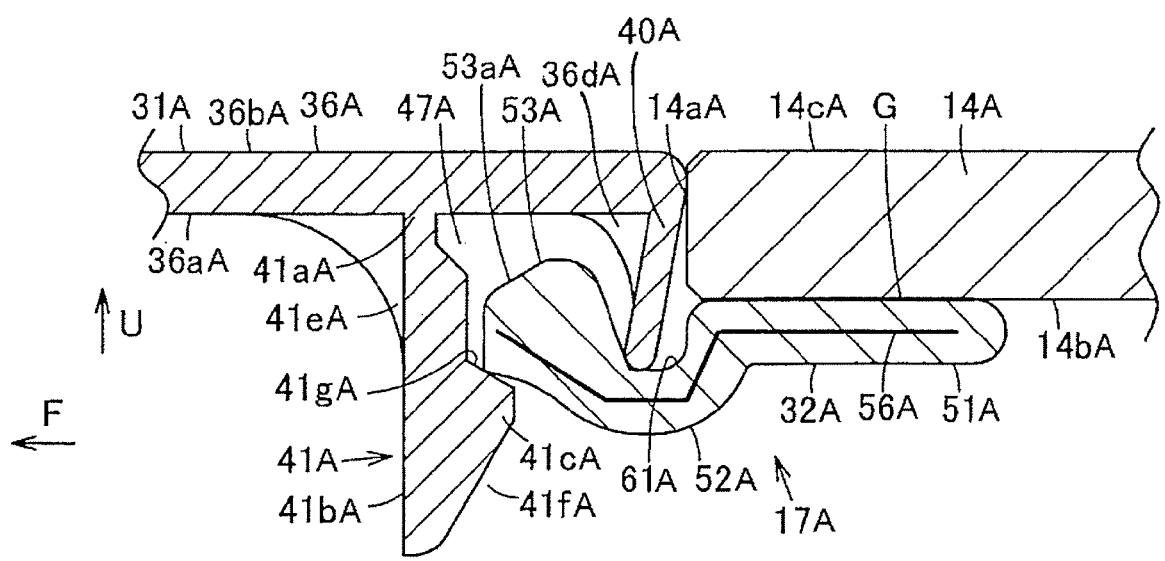
FIG. 27 is a longitudinal cross section showing a part of a ninth embodiment of a cowl-cover device of the present invention.

Next, a ninth embodiment will be described with reference to FIG. 27 and FIG. 28. It is to be noted that like constituent elements and functions in the respective embodiments described above are designated by like reference numerals and a duplicate description thereof is not given.

In the embodiment, in place of the soft portion 54A of the sixth embodiment described above, a spacer recessed portion 61A that is a groove-shaped positioning groove portion is formed along a lateral direction in a spacer 32A.

This spacer recessed portion 61A is provided so as to be recessed at an upper side of an extension portion 52A, and a tip end side of a flange portion 40A of a cowl-top cover 31A is inserted into, and is fixed to its appropriate portion. In addition, this spacer recessed portion 61A is positioned on a front lower side of an edge part 14aA that exists on a front end of a front glass 14A, that is, more downward than a back face 14bA of the front glass 14A.

Further, a reinforce rib portion 36dA of the flange 40A is provided between a back face 36aA and the flange portion 40A, of a cover main body 36A of the cowl-top cover 31A.

Figure 28:
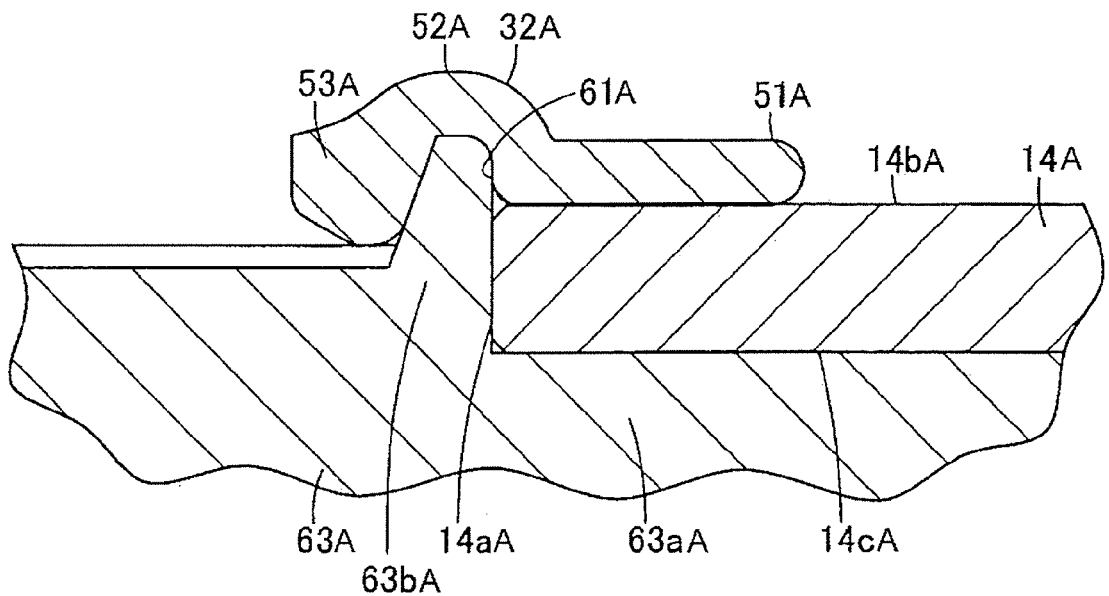
FIG. 28 is an explanatory cross section showing a process for mounting a receptacle member of the cowl-cover device.

Furthermore, when the spacer 32A is securely fixed to the front glass 14A, a jig 63A shown in FIG. 28 is employed.

Herein, this jig 63A is provided with a flat plate-shaped flat portion 63aA and a jig protrusion portion 63bA that protrudes in a substantially perpendicular shape with a protrusion quantity that is greater than a thickness of the front glass 14A upward from this flat portion 63aA. In addition, the flat portion 63aA is abutted against a surface 14cA of the front glass 14A, the jig protrusion portion 63bA is abutted against an edge part 14aA of the front glass 14A and then a spacer 32A is mounted so as to engage a spacer recessed portion 61A with a tip end of this jig protrusion portion 63bA. Further, a target securely fixing portion 51A is taken along a back face 14bA of the edge part 14aA of the front glass 14A, and is securely fixed thereto by means of an adhesive agent G, whereby the spacer 32A is securely fixed in a state in which the spacer is precisely positioned with respect to the front glass 14A.

In addition, at the time of assembling the cowl-top cover 31A, the flange portion 40A is inserted into the spacer recessed portion 61A of the spacer 32A and then is positioned in a forward and backward direction, and further, the positioned spacer is pushed downward, whereby a lower tilt face 41fA at a rear part of the claw portion 41cA abuts against an engagement portion 53A of the spacer 32A. By means of a tilt of this lower tilt face 41fA, an engagingly stop claw portion 41A elastically turns forward and shrinks, and further, the cowl-top cover 31A is pushed downward. In this manner, the claw portion 41cA rolls over the engagement portion 53A of the spacer 32A and then the engagingly stop claw portion 41A turns so as to be restored rearward, and further, the claw portion 41cA is engaged with a lower part of the engagement portion 53A. As a result, the cowl-top cover 31A is engagingly stopped at and is locked with the spacer 32A in a state in which the cowl-top cover 31A is stopped upward so as not to slip off. In this state, the flange portion 40A abuts against the edge part 14aA of the front glass 14A, and a gap between the cowl-top cover 31A and the edge part 14aA of the front glass 14A is closed.

Therefore, according to the embodiment, the spacer recessed portion 61A is provided in the spacer 32A, and the flange portion 40A is adapted so as to be inserted into this spacer recessed portion 61A and then be positioned as is in the recessed portion, whereby the cowl-top cover 31A can be reliably positioned in a forward and backward direction while the spacer 32A is easily formed without a need to carry out double color molding.

In addition, the spacer 32A is securely fixed to the front glass 14A by employing the jig 63A, whereby the spacer can be fixed in a state in which the spacer recessed portion 61A is reliably positioned with respect to the front glass 14A.

[Tenth Embodiment]

Figure 29:
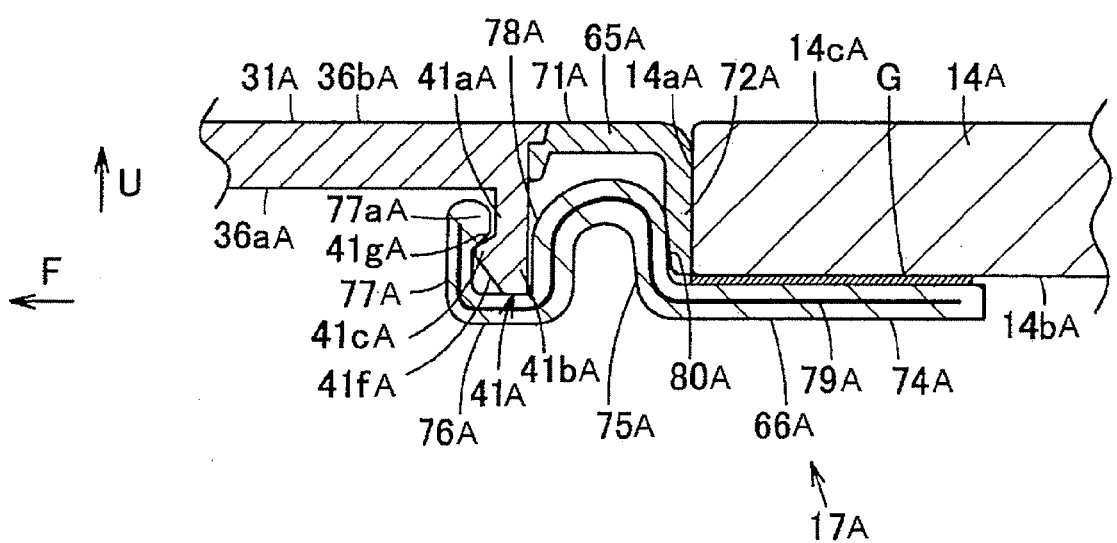
FIG. 29 is a longitudinal cross section showing a part of a tenth embodiment of a cowl-cover device of the present invention.
Figure 30:
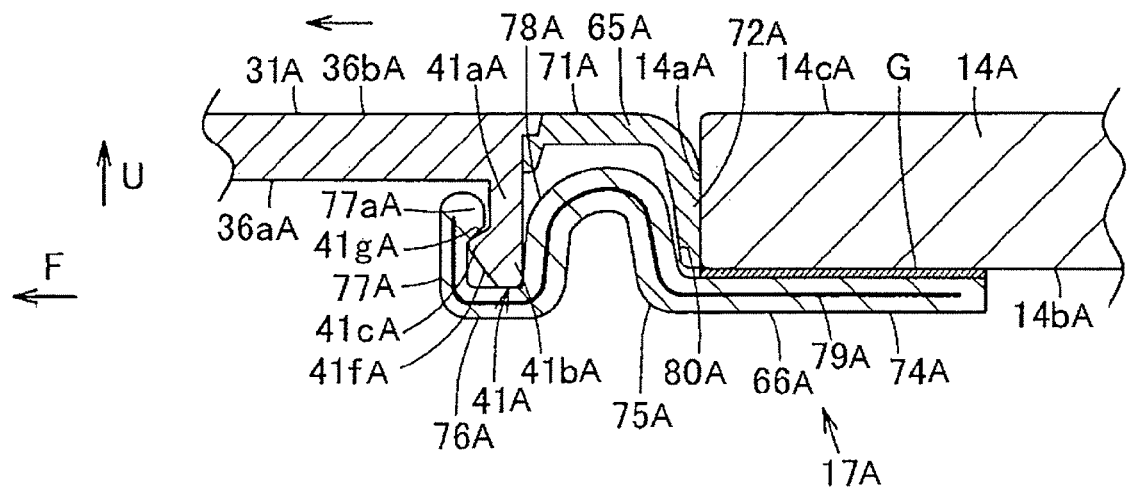
FIG. 30 is a longitudinal cross section showing a part of a cowl cover of the cowl-cover device when the cover is thermally deformed.
Figure 31:
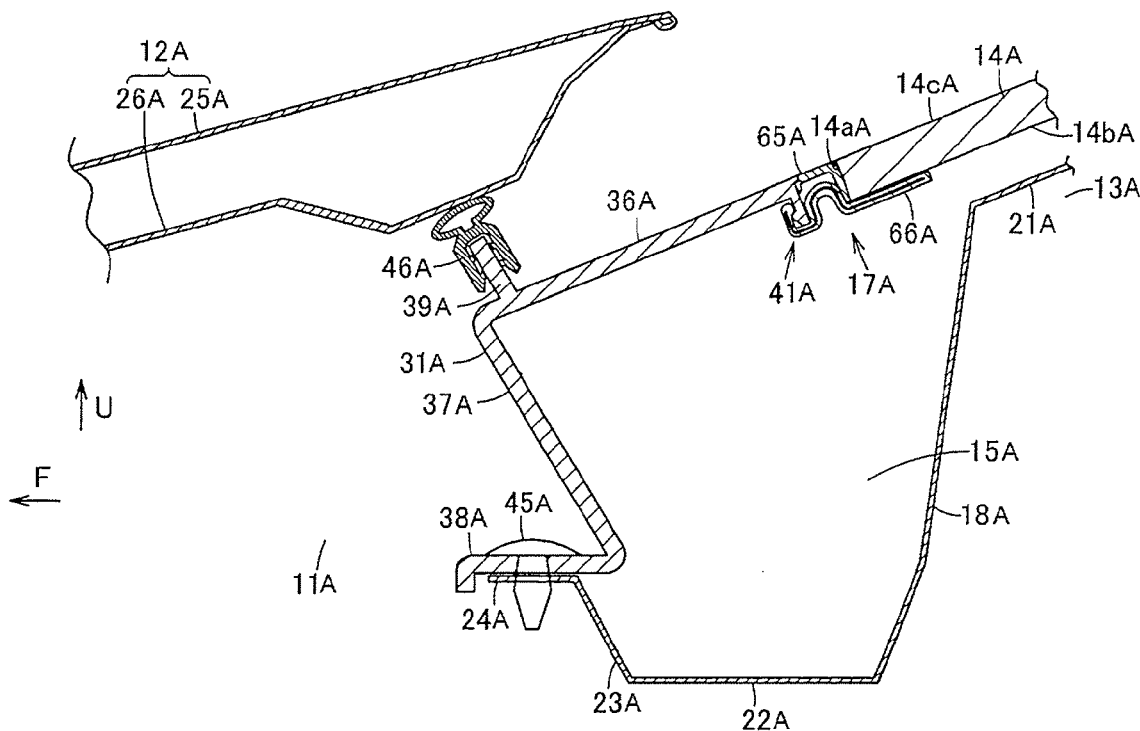
FIG. 31 is a longitudinal cross section showing a part of a vehicle with which the same cowl-cover device is assembled.

Next, a tenth embodiment will be described with reference to FIG. 29 to FIG. 31. It is to be noted that like constituent elements and functions in the respective embodiments described above are designated by like reference numerals, and a duplicate description thereof is not given.

In the embodiment, the claw portion 41cA of the cowl-top cover 31A of the respective embodiment described above is protrusively provided forward of the engagingly stop claw portion 41A, that is, on the side of an opposite front glass 14A, and at a rear end part of the cover main body portion 36A, a spacer 65A that serves as a cover member is provided in place of the flange portion 40A, and a receptacle member 66A is provided in place of the spacer 32A.

The claw portion 41cA is formed in an undercut shape with respect to a mold release direction of a die for molding the cowl-top cover 31A, and serves as a single hood with respect to the receptacle member 66A.

In addition, the spacer 65A is integrally molded with the cover main body portion 36A of the cowl-top cover 31A by means of double color molding or the like with the use of a member which is softer and more elastic than a member made of a synthetic resin or the like, which forms the cowl-top cover 31A, such as a synthetic resin or a rubber, for example. This spacer is provided with: a cover portion 71A that protrudes in a horizontal manner rearward from a rear end part of the cover main body portion 36A; and an insert portion 72A as a positioning portion that protrudes in a bent shape (flange shape) downward from a rear end part that is a tip end part of this cover portion 71A.

The cover portion 71A serves as a portion adapted to cover and close a portion between an edge part 14aA on a front end of a front glass 14A and a rear end of the cover main body portion 36A of the cowl-top cover 31A.

In addition, the insert portion 72A is held by means of a securely fixed receptacle member 66A of the front glass 14A, thereby maintaining closing by means of the cover portion 71A between the edge part 14aA on the front end of the front glass 14A and a rear end of the cover main body portion 36A of the cowl-top cover 31A. Further, a lower end part of this insert portion 72A is positioned more upward than a lower end part of the engagingly stop claw portion 41A of the cowl-top cover 31A.

On the other hand, a receptacle member 66A is formed of a soft and elastic member such as a synthetic resin or the rubber, for example, and is provided with: a target securely fixing portion 74A that is securely fixed via an adhesive agent F to the side of a back face 14bA of the edge part 14aA of the front glass 14A; a protrusion portion 75A that is provided to extend at a front part of this target securely fixing portion 74A, the protrusion portion protruding to a position opposite to that of the edge part 14aA of the front glass 14A; an extension portion 76A that is provided to extend forward from the front end of this protrusion portion 75A; and an engagement portion 77A that is provided at a tip end part of this extension portion 76A. Between this engagement portion 77A and the extension portion 76A, a groove-shaped engagement groove portion 78A is formed along a transverse widthwise direction. In addition, the inside of this receptacle member 66A is embedded with a reinforce core 79A for reinforcement.

The target securely fixing portion 74A is formed in a flat shape, and an adhesive agent G is applied to an upper side thereof.

In addition, the protrusion portion 75A is spaced forward from the edge part 14aA of the front glass 14A, and between this protrusion portion 75A and the edge part 14aA of the front glass 14A, an insert groove portion 80A is formed as being a groove-shaped positioning groove portion (that faithfully follows a curvature of the edge part 14aA of the front glass 14A) taken along a front part of the edge part 14aA of the front glass 14A. Into this insert groove portion 80A, a lower end part of an insert portion 72A of the spacer 65A is inserted, and a rear end of the cowl-top cover 31A is positioned therein with respect to the receptacle member 66A (front glass 14A).

In addition, the engagement portion 77A is protrusively provided upward from a front end part of the extension portion 76A, and at an upper end part that is a tip end part, an engagement claw 77aA is protrusively provided rearward, that is, inward of the engagement groove portion 78A.

Further, the engagement groove portion 78A serves as a portion into which the engagingly stop claw portion 41A of the cowl-top cover 31A is to be inserted.

Furthermore, the reinforce core 79A is formed of a member such as a metal plate, for example, which has a greater rigidity than that of the receptacle member 66A. This reinforce core is disposed from the target securely fixing portion 74A all over the protrusion portion 75A, the extension portion 76A, and the engagement portion 77A. It is to be noted that this reinforce core 79A is not a mandatory constituent element.

Moreover, at the time of assembling the cowl-cover device 17A, first, the target securely fixing portion 74A of the receptacle member 66A is securely fixed by means of an adhesive agent G, to the side of the back face 14bA of the edge part 14aA on the front end of the front glass 14A that is assembled with a vehicle body 10A. At this time, it is preferable that in the receptacle member 66A, the protrusion portion 75A be spaced at a predetermined distance from the edge part 14aA of the front glass 14A by employing a jig, although not shown, for example, and be positioned in a location in which the insert groove portion 80A is formed.

Next, the cowl-top cover 31A with which the spacer 65A is integrally molded is positioned in a forward and backward direction by inserting the insert portion 72A into the insert groove portion 80A and then the engagingly stop claw portion 41A is inserted into the engagement groove portion 78A, and is pushed further downward. In this way, a lower tilt face 41fA at a front part of the claw portion 41cA abuts against the engagement claw 77aA of the engagement portion 77A by means of a tilt of this lower tilt face 44fA and then the engagingly stop claw portion 41A elastically turns and shrinks rearward in the engagement groove portion 78, and further, the cowl-top cover 31A is pushed downward. In this manner, the claw portion 41cA rolls over the engagement claw 77aA of the engagement portion 77A and then the engagingly stop claw portion 41A turns so as to be restored forward, and further, the claw portion 41cA is engaged with the engagement portion 77A. As a result, the cowl-top cover 31A is engagingly stopped at and is locked with the receptacle member 66A in a state in which the cowl-top cover 31A is stopped upward so as not to slip off, and the cowl-top cover 31A is positioned in a vertical direction. In this state, the spacer 65A that is integrated with the cowl-top cover 31A comes into intimate contact with the edge part 14aA of the front glass 14A and then a gap associated with this edge part 14aA is closed, and further, the surface 36bA of the cover main body portion 36A is substantially flush with the surface 14cA of the front glass 14A.

In addition, a mount portion of a vehicle mount portion 38A is fixed to a support plate portion 24A by employing a mount bracket 45A, whereby the cowl-top cover 31A is fixed to the vehicle body panel 18A in a state in which the cowl portion 15A is covered therewith.

Therefore, accordant to the embodiment, even if a positional relationship between the cowl-top cover 31A and the front glass 14A relatively varies due to a deformation of the cowl-top cover 31A such as shrinkage exerted by heat transmission from the engine room 11A or the like, or alternatively, due to a dimensional deviation of the cowl-top cover 31A, for example, the soft spacer 65A that is fixed by inserting the insert portion 72A that is a tip end between the edge part 14aA on the side of the cowl-top cover 31A of the front glass 14A and the protrusion portion 75A of the receptacle member 66A faithfully follows this variation quantity, thus making it possible to prevent degradation of an external view or entry of a moisture into the cowl portion 15A or the like due to opening a portion between the edge part 14aA on the side of the cowl-top cover 31A of the front glass 14A and the cover main body portion 36A.

Figure 32:
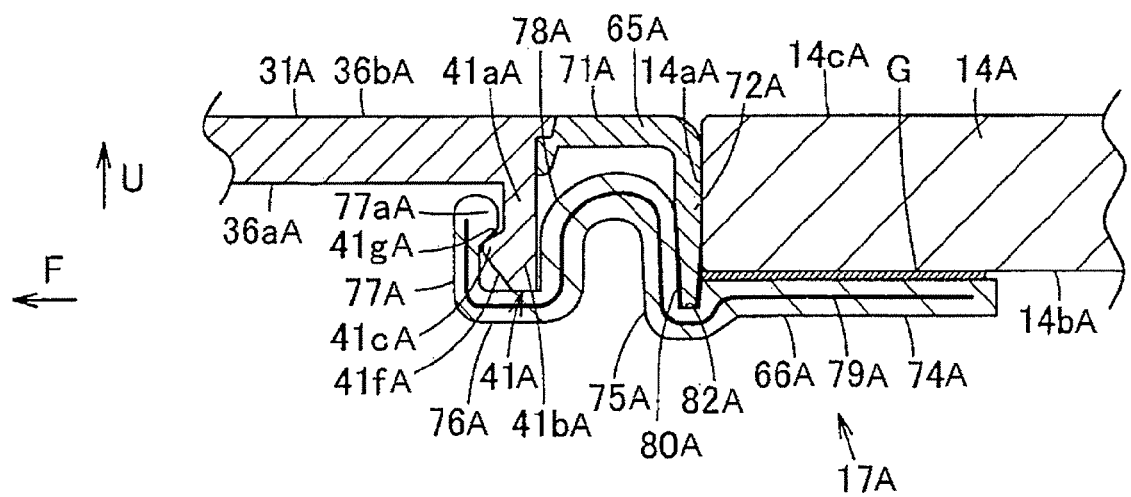
FIG. 32 is a longitudinal cross section showing a part of an eleventh embodiment of a cowl-cover device of the present invention.

It is to be noted, in the tenth embodiment described above, as is the case with in an eleventh embodiment shown in FIG. 32, a recessed portion 82A that communicates with an insert groove portion 80A is formed between a target securely fixing portion 74A and a protrusion portion 75A of a spacer 65A, an insert portion 72A of the spacer 65A is protruded more downward than a lower end part of the engagingly stop claw portion 41A, this insert portion 72A is inserted more deeply into the insert groove portion 80A and the recessed portion 82A, whereby the insert portion 72A of the spacer 65A may be more reliably held on the receptacle member 66A. In this case, even in a case where the heat shrink deformation quantity of the cowl-top cover 31A is greater, the spacer 65A does not slip off, making it possible to more reliably prevent producing of a gap between the cover main body portion 36A and the edge part 14aA of the front glass 14A.

[Twelfth Embodiment]

Figure 33:
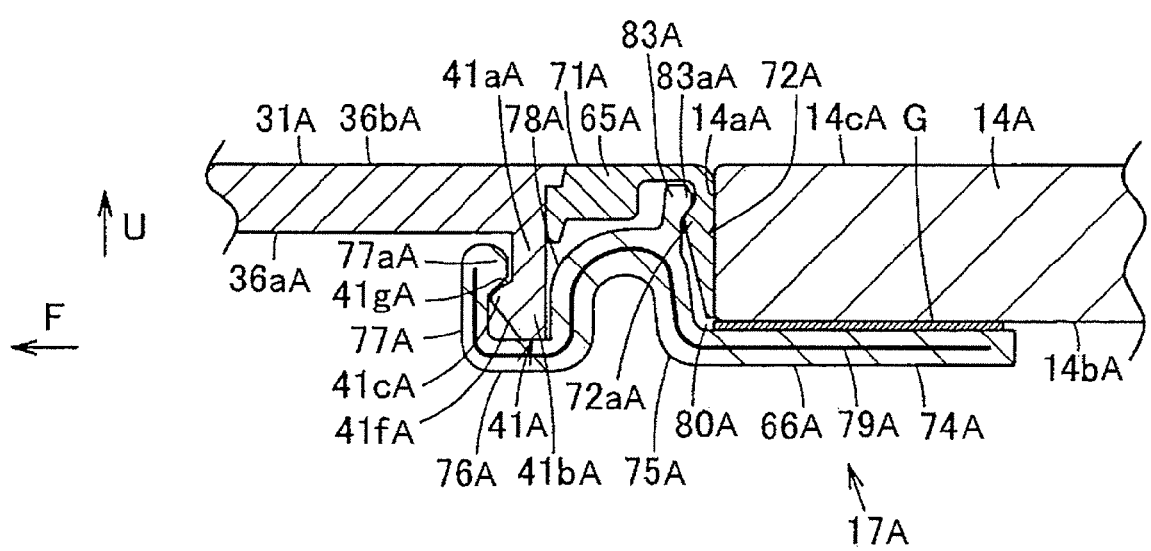
FIG. 33 is a longitudinal cross section showing a part of a twelfth embodiment of a cowl-cover device of the present invention.

Next, a twelfth embodiment will be described with reference to FIG. 33. It is to be noted that like constituent elements and functions in the respective embodiments described above are designated by like reference numerals and a duplicate description thereof is not given.

In the embodiment, an engagement claw portion 83A is protrusively provided at an upper part on a rear side of the protrusion portion 75A of the receptacle member 66A of the tenth embodiment described above.

This engagement claw portion 83A is constructed in such a manner that: an engagement claw 83aA is protrusively provided at a rear part that is on the side of an edge part 14aA of a front glass 14A on a tip end part thereof; and this engagement claw 83aA engages with a claw engagement portion 72aA that is protrusively provided at a front part on a tip end side of an insert portion 72A, thereby engagingly stopping an insert portion 72A of a spacer 65A at a receptacle member 66A.

In addition, at the time of assembling a cowl-top cover 31A with which the spacer 65A is integrally molded, the insert portion 72A is inserted into an insert groove portion 80A, whereby the cowl-top cover 31A is positioned in a forward and backward direction and then the engagement claw portion 83A of the spacer 65A is engaged with the claw engagement portion 72aA of this insert portion 72A, reliably stopping the spacer 65A so as not to slip off from the receptacle member 66A.

Therefore, according to the embodiment, the engagement claw portion 83A that is protrusively provided in the receptacle member 66A toward the insert groove portion 80A is engaged with the claw engagement portion 72aA of the insert portion 72A of the spacer 65A to be inserted into the insert groove portion 80A, whereby the spacer 65A can be securely fixed, making it possible to more reliably prevent a gap from being produced between the cover main body portion 36A and the edge part 14aA of the front glass 14A. Therefore, it is possible to cope with a request for higher quality with respect to a slip-off and looseness (lifting float) of the spacer 65A.

[Thirteenth Embodiment]

Figure 34:
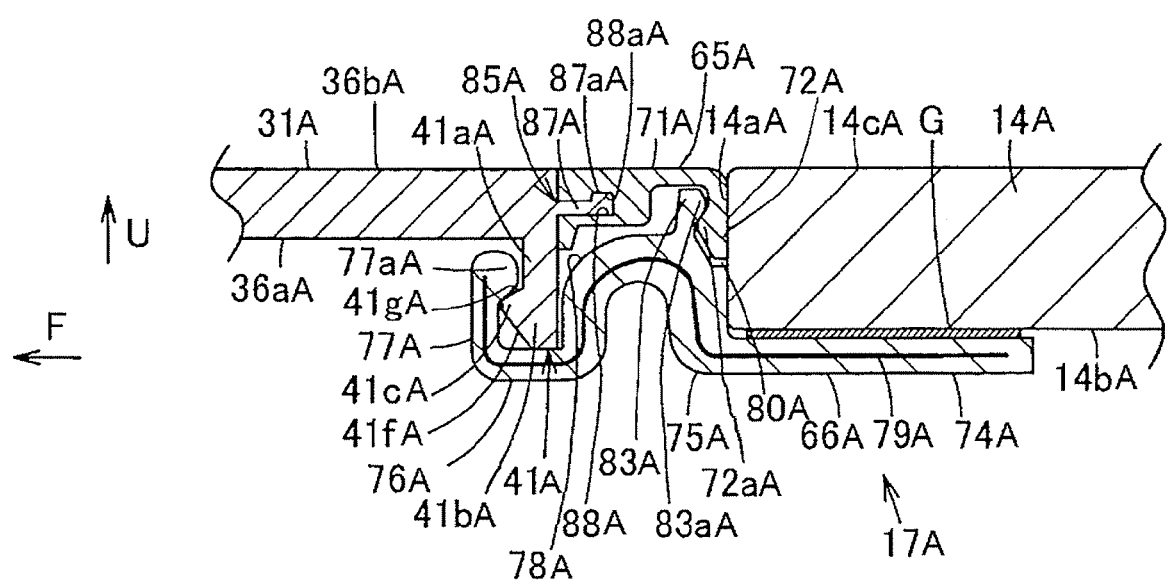
FIG. 34 is a longitudinal cross section showing a part of a thirteenth embodiment of a cowl-cover device of the present invention.

Next, a thirteenth embodiment will be described with reference to FIG. 34. It is to be noted that like constituent elements and functions in the respective embodiments described above are designated by like reference numerals and a duplicate description thereof is not given.

In the embodiment, the spacer 65A of the twelfth embodiment described above is molded by means of extrusion molding or the like separately from a cover main body portion 36A of a cowl-top cover 31A, and is integrally fixed to a rear end part of the cover main body 36A via a fixing portion 85A.

The fixing portion 85A is provided with: an engagement protrusion portion 87A that is protrusively provided in a horizontal manner backward from the rear end part of the cover main body portion 36A; and an engagement recessed portion 88A that is provided so as to be recessed in a front end part of a cover portion 71A of the spacer 65A, for example.

The engagement protrusion portion 87A is formed in the shape of a longitudinal rail taken along a transverse direction. In addition, this engagement protrusion portion 87A is constructed in such a manner that: an engagement claw portion 87aA is protrusively provided at an upper part of a rear end part that is a tip end part; and this engagement claw portion 87aA engages with an engagement recessed portion 88aA that is provided in the engagement recessed portion 88A to thereby fix the spacer 65A to the cover main body portion 36A.

Therefore, according to the embodiment, the spacer 65A is formed separately from the cowl-top cover 31A, whereby the spacer 65A can be molded more easily by means of extrusion molding or the like without a need to carry out double color molding or the like.

It is to be noted that in the thirteenth embodiment described above, the fixing portion 85A to be fixed to the spacer 65A and the cover main body portion 36A may be constructed by employing a known technique such as press-in, welding, adhesive bonding, or adhesive tape, for example.

In addition, the fixing portion 85A described above may be applied to a respective one of the tenth to twelfth embodiments described above.

Further, in the respective embodiments described above, the cowl-top cover 31A can also be disposed between a rear glass and a rear trunk hood, for example, by providing the cover at a portion other than the front part of vehicle body 10A.

Furthermore, in the respective embodiments described above, a wind shield is not limited to a glass-based shield, and a transparent material such as an acryl can also be employed.

[Industrial Applicability]

The present invention can be preferably applied as a cowl-top cover mounting structure. In addition, the present invention can be applied to a cowl cover device that is disposed adjacent to an engine room of an automobile, for example.

What is claimed is:

1. A structure of mounting a cowl-top cover, the structure comprising:
    a cowl cover including a cover main body portion adapted to cover a cowl portion between a front glass and a vehicle body member and an engagement stop claw portion that is protrusively provided on a back face side of the cover main body portion, and that has a claw portion on one side face;
    two rows of protrusions extending from a bottom surface of the cover main body, wherein a proximal row comprises at least one flange or an insert portion and an inset row comprises stop claws, wherein the at least one flange is located between an edge part of the front glass and the engagement portion; and
    a receptacle member having a target securely fixing portion to be securely fixed to a back face side of an edge part of the front glass and an engagement portion which is protrusively provided from the target securely fixing portion, and with which the claw portion engages,
    wherein when the claw portion is engaged with the engagement portion, a surface of the cowl cover and a surface of the front glass are arranged to be flush with each other.

2. The structure of mounting the cowl-top cover according to claim 1, wherein the claw portion is formed to be protruded from the engagingly stop claw portion toward the front glass side.

3. The structure of mounting the cowl-top cover according to claim 1, wherein the receptacle member includes a protrusion portion that is positioned between the target securely fixing portion and the engagement portion, and that protrudes in opposite to an edge part on the cowl cover side of the front glass, and
    the structure of mounting the cowl-top cover includes a soft cover member which is protrusively provided integrally at an edge part on the front glass side of the cover main body portion, and in which a tip end side is inserted and fixed between the edge part on the cowl-cover side of the front glass side and the protrusion portion to thereby cover a portion between the edge part on the cowl-cover side of the front glass and the cover main body portion.

* * * * *